(12) United States Patent
Someya et al.

(10) Patent No.: US 7,764,412 B2
(45) Date of Patent: Jul. 27, 2010

(54) IMAGE SCANNER AND SIGNAL PROCESSING METHOD

(75) Inventors: Jun Someya, Tokyo (JP); Yoshiaki Okuno, Tokyo (JP); Satoshi Yamanaka, Tokyo (JP); Toru Shiraki, Tokyo (JP); Hironobu Arimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 704 days.

(21) Appl. No.: 10/589,661

(22) PCT Filed: Jun. 28, 2004

(86) PCT No.: PCT/JP2004/009109

§ 371 (c)(1),
(2), (4) Date: Jun. 22, 2007

(87) PCT Pub. No.: WO2005/081513

PCT Pub. Date: Sep. 1, 2005

(65) Prior Publication Data

US 2007/0285683 A1   Dec. 13, 2007

(30) Foreign Application Priority Data

Feb. 20, 2004  (JP)  .............................. 2004-044662

(51) Int. Cl.
*H04N 1/46* (2006.01)
(52) U.S. Cl. .................. 358/525; 358/1.9; 358/447; 358/448; 358/505; 382/254; 382/300
(58) Field of Classification Search ......... 358/482–483, 358/525, 1.9, 447–448, 505–515; 382/300
See application file for complete search history.

(56) References Cited

U.S. PATENT DOCUMENTS

| 4,092,725 | A | * | 5/1978 | Hershman | .................. | 708/820 |
| 4,776,031 | A | * | 10/1988 | Mita | .......................... | 382/323 |
| 5,003,380 | A | | 3/1991 | Hirota | | |
| 5,430,811 | A | | 7/1995 | Fukushima et al. | | |
| 6,271,933 | B1 | * | 8/2001 | Asai et al. | ..................... | 358/1.2 |

(Continued)

FOREIGN PATENT DOCUMENTS

EP   0 357 054 A2   8/1989

(Continued)

*Primary Examiner*—King Y Poon
*Assistant Examiner*—Richard Z Zhu
(74) *Attorney, Agent, or Firm*—Birch, Stewart, Kolasch & Birch, LLP

(57) ABSTRACT

Interpolation data for a missing pixel are obtained (4) after a correction (3) for variations in the characteristics of the imaging devices (8(1), 8(2)). The correction for variations in characteristics includes, for example, a black level correction (9) and a sensitivity correction (10). The interpolation includes, for example, interpolation calculations (14(1), 14(2)) such that a mean value of a plurality of pixels including the missing pixel and a mean value of a plurality of pixels not including the missing pixel become equal and an interpolation calculation (14(0)) that takes the mean of the pixels to the right and left of the missing pixel, the calculation with the least error being selected (13, 15). Thus missing pixels in highly periodic images can be properly interpolated, and interpolation can be performed with high precision even when there are variations in the sensitivity characteristics of the individual imaging devices constituting the contact image sensor.

8 Claims, 28 Drawing Sheets

U.S. PATENT DOCUMENTS

| | | |
|---|---|---|
| 6,373,995 B1 | 4/2002 | Moore |
| 6,567,192 B1 * | 5/2003 | Toyomura et al. .......... 358/497 |
| 6,707,937 B1 * | 3/2004 | Sobel et al. ................. 382/162 |
| 6,714,242 B1 * | 3/2004 | Kobayashi .................. 348/272 |
| 6,724,945 B1 * | 4/2004 | Yen et al. .................... 382/274 |
| 6,882,364 B1 * | 4/2005 | Inuiya et al. ................ 348/252 |
| 2007/0092156 A1 * | 4/2007 | Yamanaka et al. .......... 382/274 |

FOREIGN PATENT DOCUMENTS

| | | |
|---|---|---|
| EP | 1 033 868 A1 | 9/2000 |
| EP | 1 276 313 A2 | 1/2003 |
| EP | 1 289 257 A1 | 3/2003 |
| EP | 1 289 265 A2 | 3/2003 |
| EP | 1 365 571 A1 | 11/2003 |
| JP | 2-228168 A | 9/1990 |
| JP | 6-296234 A | 10/1994 |
| JP | 2000-196835 A | 7/2000 |
| JP | 2001-251482 A | 9/2001 |
| JP | 2002-232654 A | 8/2002 |
| JP | 2003-101724 A | 4/2003 |

* cited by examiner

SCANNING POSITION

← SCANNING POSITION

← SCANNING POSITION

FIG.10(a)
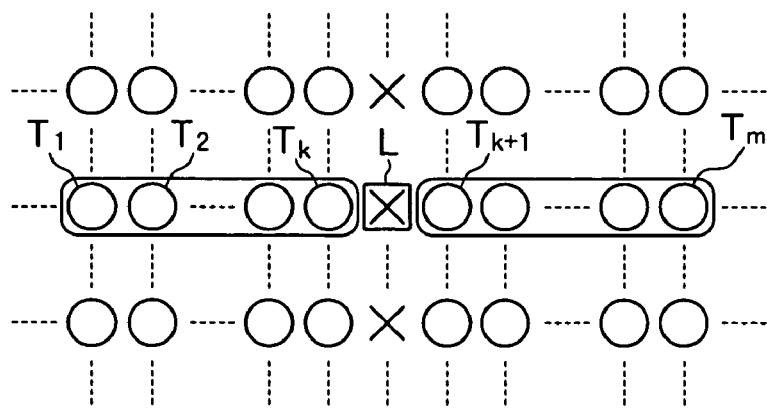
FIG.10(b)
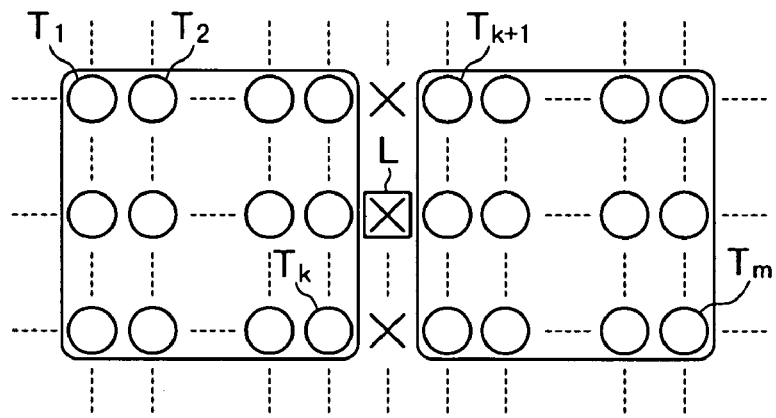
FIG.11
|  | $T_1$ | $T_2$ | ····· | $T_m$ |
|---|---|---|---|---|
| LEFT-RIGHT MEAN INTERPOLATION CALCULATION CIRCUIT | $M0[T_1]$ | $M0[T_2]$ | ····· | $M0[T_m]$ |
| FIRST MEAN PRESERVING INTERPOLATION CALCULATION CIRCUIT | $M1[T_1]$ | $M1[T_2]$ | ····· | $M1[T_m]$ |
| ⋮ | ⋮ | ⋮ | ⋮ | ⋮ |
| nTH MEAN PRESERVING INTERPOLATION CALCULATION CIRCUIT | $Mn[T_1]$ | $Mn[T_2]$ | ····· | $Mn[T_m]$ |

| | |
|---|---|
| LEFT-RIGHT MEAN INTERPOLATION CALCULATION CIRCUIT | S0 |
| FIRST MEAN PRESERVING INTERPOLATION CALCULATION CIRCUIT | S1 |
| ⋮ | ⋮ |
| nTH MEAN PRESERVING INTERPOLATION CALCULATION CIRCUIT | Sn |

FIG.19

|     | T1 | T2 | T3 | T4 |
|-----|----|----|----|----|
| M0  | 0  | 56 | 26 | 30 |
| M1  | 0  | 0  | 0  | 0  |
| M2  | 69 | 69 | 26 | 69 |

FIG.20

| S0 | 112 |
|----|-----|
| S1 | 0   |
| S2 | 233 |

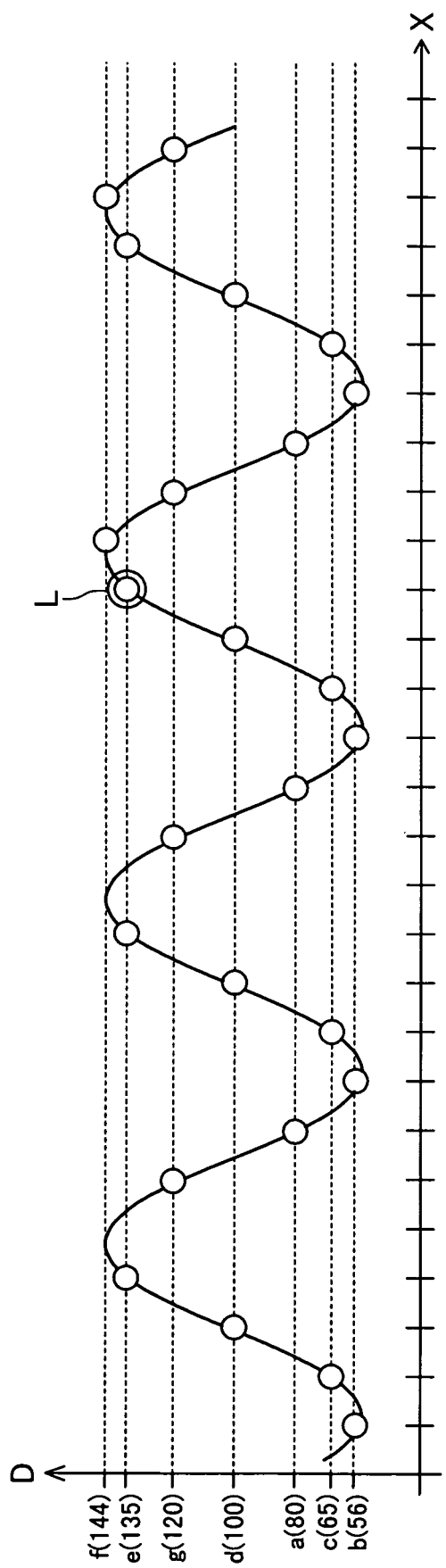
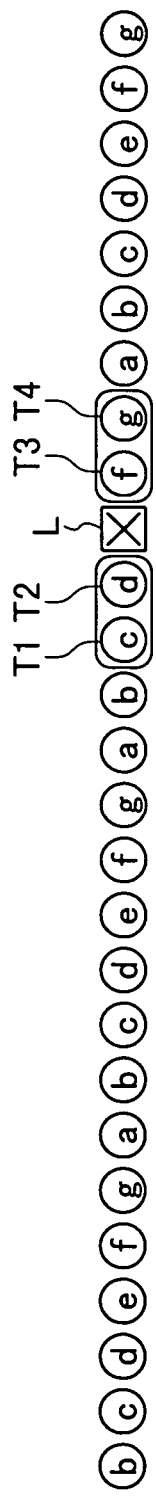
FIG.21(a)
FIG.21(b)

FIG.22

|    | T1  | T2  | T3  | T4 |
|----|-----|-----|-----|----|
| M0 | 13  | 4.5 | 71  | 8  |
| M1 | 143 | 35  | 143 | 35 |
| M2 | 0   | 0   | 0   | 0  |

FIG.23

| S0 | 96.5 |
|----|------|
| S1 | 356  |
| S2 | 0    |

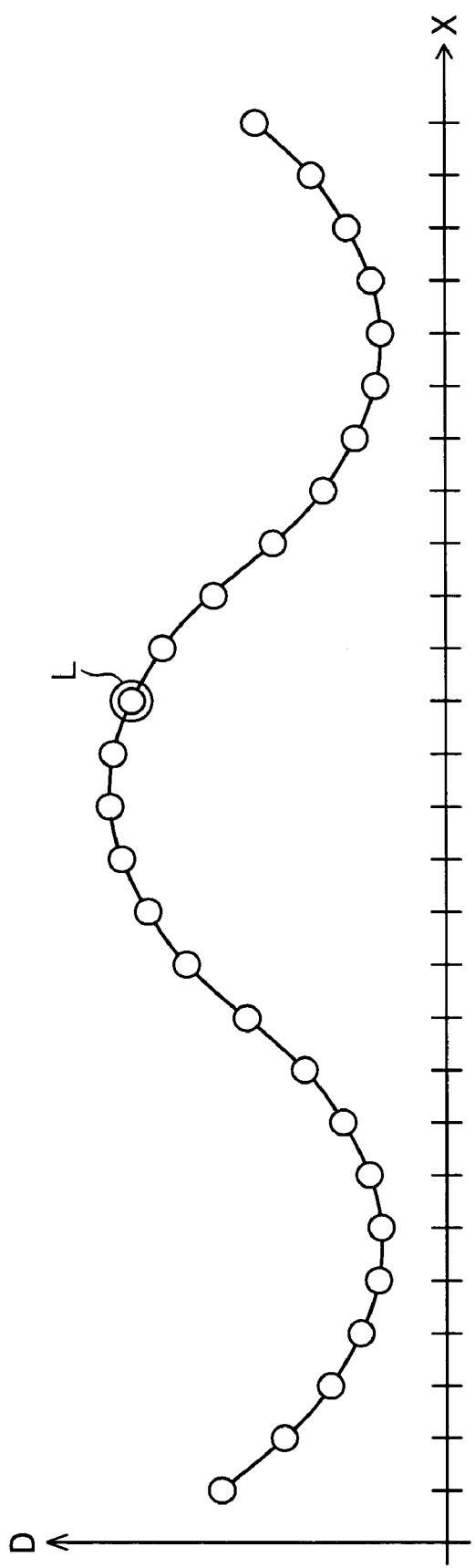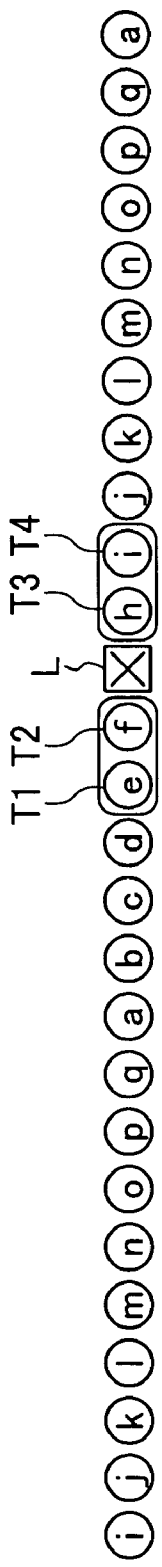

|  | T1 | T2 | T3 | T4 |
|---|---|---|---|---|
| M0 | 3.5 | 8.5 | 1.5 | 0 |
| M1 | 91 | 152 | 91 | 152 |
| M2 | 191 | 269 | 86 | 191 |

| S0 | 13.5 |
|---|---|
| S1 | 486 |
| S2 | 737 |

IMAGE SCANNER AND SIGNAL PROCESSING METHOD

FIELD OF THE INVENTION

The present invention relates to an image scanner using a contact image sensor, and a signal processing method.

BACKGROUND ART

Methods employed in conventional pixel interpolation circuits to calculate interpolation data for missing pixels include a method in which the mean of the values of the pixels adjacent to a missing pixel is used as the interpolation data, a method in which a regression line is found for the pixels adjacent to a missing pixel by use of the least squares method and the interpolation data are calculated from the regression line, and a method in which a quartic curve is found from the four pixels adjacent to a missing pixel and the interpolation data are calculated from its quartic equation (see, for example, Patent Document 1).

Patent Document 1: Japanese Patent Application Publication No. 2003-101724 (pp. 5-6, FIGS. 3-5)

DISCLOSURE OF THE INVENTION

Problems to be Solved by the Invention

In conventional image scanners, because linear interpolation or interpolation using a higher degree function is performed at points where the imaging devices in the contact image sensor are not evenly spaced (referred to as missing pixels below, because they are equivalent to the absence of an imaging device), correct interpolation may be impossible due to variations in sensitivity or other characteristics of the individual imaging devices constituting the contact image sensor, resulting in degraded quality of scanned images. In particular, large interpolation errors occur when highly periodic images are scanned, greatly degrading the quality of the scanned images.

This invention addresses the above problem, with the object of obtaining an image scanner and a signal processing method that can properly interpolate missing pixels included in a highly periodic image, and that can perform highly accurate interpolation even if there are variations in sensitivity and other characteristics of the individual imaging devices constituting the contact image sensor.

Means of Solution of the Problems

This invention provides an image scanner for scanning an image by using an image sensor with a plurality of imaging devices disposed in a single row, comprising:

an imager unit having a plurality of sensor chips disposed in a single connected row, each sensor chip having a plurality of imaging devices;

an analog-to-digital converter for converting an image signal output from the imager unit to digital pixel data;

a compensator unit for correcting for variations in characteristics of the imaging devices of the sensor chips; and an interpolator unit for interpolating missing pixel data occurring at points where the sensor chips are connected with each other; wherein the interpolator unit performs missing pixel interpolation after the compensator unit corrects for the variations in the characteristics of the imaging devices.

Effect of the Invention

In an image scanner according to the present invention, since interpolation processing is performed after processing of the image data obtained by the contact image sensor to correct for variations in characteristics of the imaging devices, a high-quality scanned image can be obtained even if a contact image sensor with missing pixels is used.

BRIEF DESCRIPTION OF THE DRAWINGS

FIGS. 10(a) and 10(b) show pixel sequences and pixel groups processed in the interpolator unit of the image scanner according to the first embodiment;

FIG. 11 is a table illustrating evaluation results of each interpolation calculation circuit when a plurality of test pixels are interpolated in the interpolator unit of the image scanner according to the first embodiment;

FIG. 14(a) shows the gray scale of the image; FIG. 14(b) is a waveform diagram; FIG. 14(c) shows a missing pixel and neighboring test pixels;

FIG. 19 is a table showing evaluation results of each interpolation calculation circuit when a plurality of test pixels are interpolated in the interpolator unit of the image scanner according to the first embodiment;

FIG. 20 is a table showing the total evaluation result of each interpolation calculation circuit in the interpolator unit of the image scanner according to the first embodiment;

FIGS. 21(a) and 21(b) show exemplary pixel data processed in the interpolator unit of the image scanner according to the first embodiment: FIG. 21(a) shows a waveform diagram; FIG. 21(b) shows a missing pixel and neighboring test pixels;

FIG. 22 is a table showing evaluation results of each interpolation calculation circuit when a plurality of test pixels are interpolated in the interpolator unit of the image scanner according to the first embodiment;

FIG. 23 is a table showing the total evaluation result of each interpolation calculation circuit in the interpolator unit of the image scanner according to the first embodiment;

FIGS. 24(a) and 24(b) show exemplary pixel data processed in the interpolator unit of the image scanner according to the first embodiment: FIG. 24(a) is a waveform diagram; FIG. 24(b) shows a missing pixel and neighboring test pixels;

Figure 1:
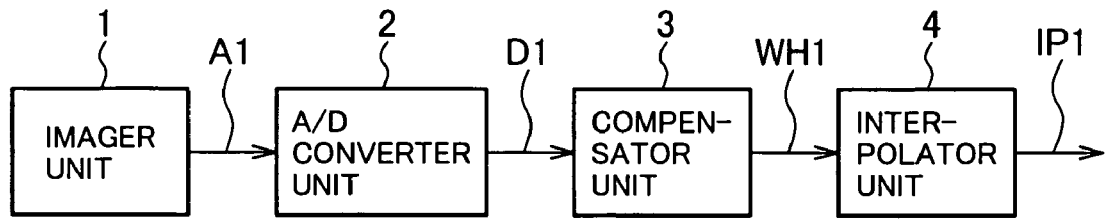
FIG. 1 is a block diagram showing the structure of an image scanner according to a first embodiment.

EXPLANATION OF REFERENCE CHARACTERS 1 imager unit, 2 analog-to-digital converter, 3 3R, 3G, and 3B compensator units, 4 4R, 4G, and 4B interpolator units, 5 contact image sensor, 6 sensor chip, 7 light source, 8 imaging device, 9 black compensation circuit, 10 sensitivity compensation circuit, 11 black compensation data generating circuit, 12 sensitivity compensation data generating circuit, 13 output circuit, 14(0) left-right mean interpolation calculation circuit, 14(1) to 14(n) mean preserving interpolation calculation circuits, 15 selection signal generating unit, 16 management circuit, 17 marking circuit, 20 output limiter unit, 21 mean preserving interpolation circuit, 31 imager unit, 32 distributor unit, 41 imager unit.

BEST MODE OF PRACTICING THE INVENTION

First Embodiment

FIG. 1 shows the structure of an image scanner according to the present invention.

The image scanner of the invention comprises an imager unit 1, an analog-to-digital (A/D) converter unit 2, a compensator unit 3, and an interpolator unit 4.

The imager unit 1, as described later, has a one-dimensional array of imaging devices; it scans an image one dimensionally and outputs an image signal. The A/D converter unit 2 converts the image signal output from the imager unit 1 to a series of digital pixel data. The compensator unit 3 corrects the pixel data output from the A/D converter unit 2 to compensate for variations in the characteristics of the imaging devices of the imager unit 1, and outputs the corrected data. The interpolator unit 4 interpolates missing pixel data by using the corrected data output from the compensator unit 3.

Figure 2:
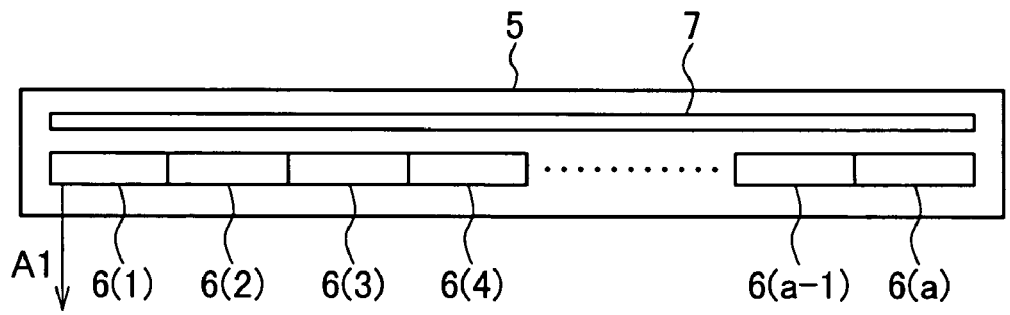
FIG. 2 schematically illustrates the imager unit in FIG. 1.

FIG. 2 illustrates the imager unit 1. The illustrated imager unit 1 comprises a contact image sensor 5. The contact image sensor 5 has a plurality of sensor chips 6, e.g., sensor chips 6(1) to 6(a), disposed in a single connected row on a substrate 5a, and a light source 7.

Figure 3:
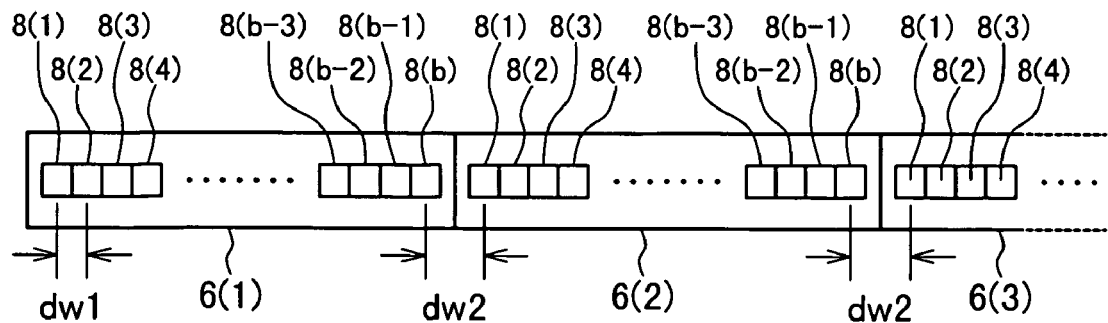
FIG. 3 is an enlarged view schematically illustrating part of the imager unit in FIG. 2.

FIG. 3 illustrates sensor chips 6(1) and 6(2) of the contact image sensor 5 in greater detail.

Each of sensor chips 6(1), 6(2), and 6(3) has a plurality of imaging devices, for example, b imaging devices 8(1) to 8(b), as shown in the drawing. Each of the imaging devices 8(1) to 8(b) represents one pixel.

Reference numeral 6 may be used below in descriptions common to all of the sensor chips; similarly, reference numeral 8 may be used in descriptions common to all of the imaging devices.

The imaging devices 8(1) to 8(b) are disposed in a straight line, spaced at intervals of dw1. The imaging devices disposed at the adjacent edges of two mutually connected sensor chips are mutually separated by a distance dw2.

For example, the imaging device 8(b) at the right edge of sensor chip 6(1) and the imaging device 8(1) at the left edge of sensor chip 6(2) are separated by distance dw2.

The sensor chips are arranged here so that dw2 is substantially double dw1, and interpolation is carried out on the assumption of one missing pixel between each pair of sensor chips. This case will be described below as it enables interpolation results of high quality to be obtained, but the present invention is not necessarily limited to this case; interpolation processing can be carried out according to distance.

Figure 4:
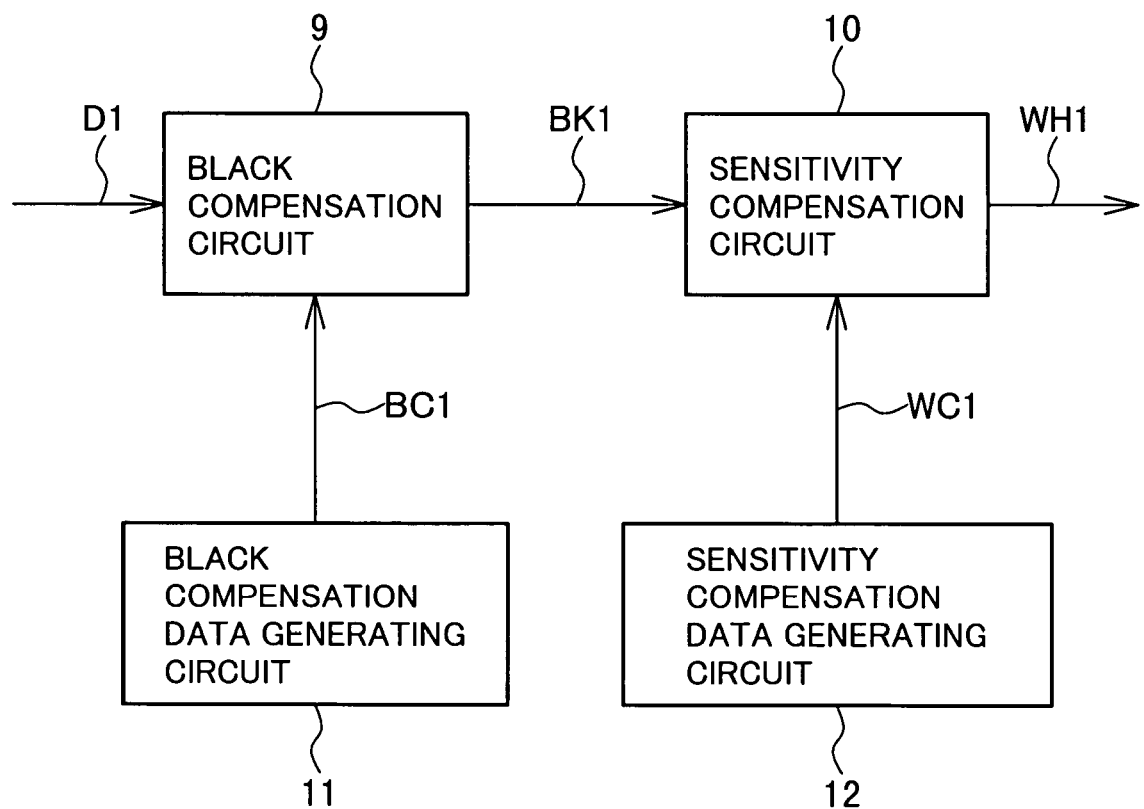
FIG. 4 is a block diagram showing details of the compensator unit in FIG. 2.

FIG. 4 is a block diagram showing details of the compensator unit 3. As shown in the drawing, the compensator unit 3 comprises a black compensation circuit 9 for correcting for black level variations of the imaging devices 8 and outputting black-level corrected image data BK1, a sensitivity compensation circuit 10 for correcting for the sensitivity variations of the imaging devices 8 and outputting sensitivity-corrected image data WH1, a black compensation data generating circuit 11 for generating black correction data BC1 used in the black compensation circuit 9, and a sensitivity compensation data generating circuit 12 for generating sensitivity correction data WC1 used in the sensitivity compensation circuit 10.

Next the operations performed up to the compensator unit 3 will be described.

The image signal A1 output from the contact image sensor 5 is input to the A/D converter unit 2. The contact image sensor 5 is controlled by a timing control signal that determines the timings at which to turn the light source 7 on and off, scan an image, and output the image signal B1, but these details will not be illustrated; it will simply be assumed that the image signal A1 is output at a certain timing. The sensor chips 6(1) to 6(a) on the contact image sensor 5 are disposed so as to form a connected array extending in a main scanning direction, the number of chips depending on the number of pixels. The image signal A1 of one line is formed by the pixel values obtained from the imaging devices, which are read out in a continuous or discontinuous series from imaging device 8(1) of sensor chip 6(1) to imaging device 8(b) of sensor chip 6(a). A two-dimensional image signal is formed by reading this line image signal at certain intervals while the contact image sensor 5 or the document travels in a sub-scanning direction.

The two-dimensional image signal thus comprises a matrix of pixels, in which the horizontal direction and the vertical direction correspond to the main scanning direction and the sub-scanning direction, respectively.

The A/D converter unit 2 converts the input image signal A1 to digital image data D1 by sampling the values of pixels comprising the input image signal A1 output from the imager unit 1. The image data D1 are output from the A/D converter unit 2 and input to the compensator unit 3.

The image data D1 input to the compensator unit 3 are supplied to the black compensation circuit 9. The black compensation circuit 9 corrects for black level variations of the imaging devices 8 in the image data D1, in accordance with the black correction data BC1 generated by the black compensation data generating circuit 11. Black level variations refer to variations in the level of the signal output while the imaging devices 8 are not exposed to light. The black compensation data generating circuit 11 holds pre-prepared black level correction data for the line of pixels, and outputs the black level correction data BC1 corresponding to each pixel of the image data D1 input to the black compensation circuit 9. If $D1(p)$ represents the image data D1 output from the A/D converter unit 2 for the pth pixel in the line, $BC1(p)$ represents the black level correction data BC1 generated by the black compensation data generating circuit 11 for this pixel, and $BK1(p)$ represents the black-level-corrected image data BK1 output by the black compensation circuit 9 for this pixel, the correction processing by the black compensation circuit 9 can be expressed as follows:

$$BK1(p)=D1(p)-BC1(p)$$

Figure 5A:
FIGS. 5(a) to 5(e) illustrate the operation of the black compensation circuit in FIG. 4.
Figure 5B:
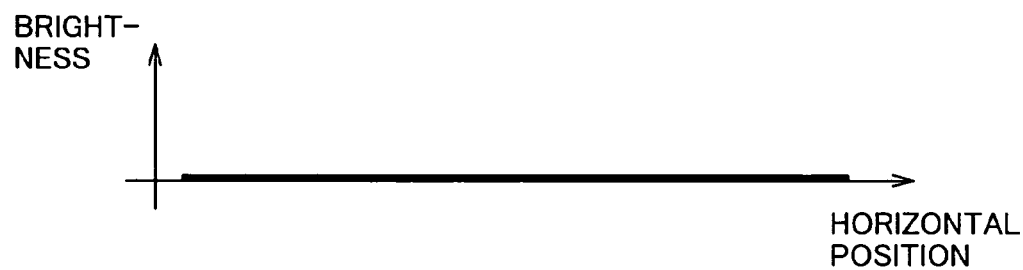
Figure 5C:
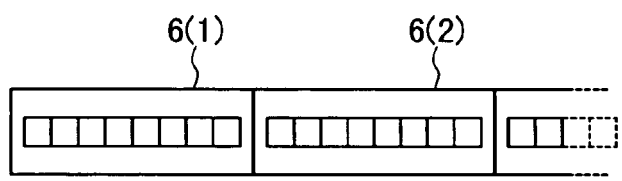
Figure 5D:
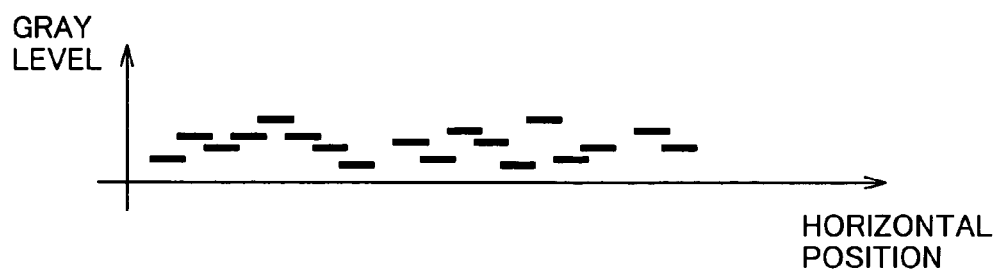
Figure 5E:

FIGS. 5(a) to 5(e) illustrate the concept of the correction operation performed by the black compensation circuit 9. FIG. 5(a) shows a scanned image in which a series of black pixels extends in the main scanning direction (the horizontal direction in the drawing) across at least the scanned width of the document at the indicated scanning position; FIG. 5(b) shows the brightness of the image at the scanning position shown in FIG. 5(a); FIG. 5(c) shows the positional relationship of the sensor chips to the scanned image in the horizontal direction (main scanning direction); FIG. 5(d) shows exemplary data indicating the brightness of the image scanned by the sensor chips; and FIG. 5(e) shows the corrected image data BK1 output by the black compensation circuit 9.

As shown in FIG. 5(d), the imaging devices on the sensor chip 6(1) and sensor chip 6(2) vary in their black data. The black compensation circuit 9 corrects for the variations and levels out the data obtained by scanning a black image (or when the imaging device 8 is not exposed to light). The black compensation data generating circuit 11 can generate the black level correction data BC1 if the data output when each imaging device 8 is not exposed to light are created and stored in it beforehand. When the black level correction processing is performed, for each imaging device 8, the data held in the black compensation data generating circuit 11 are supplied to the black compensation circuit 9 as $BC1(p)$ in the equation shown above.

The correction process described above may be performed individually for each imaging device 8 (each pixel), or the black compensation circuit 9 may correct the pixel data from a plurality of imaging devices 8 by means of a single stored correction value, such as a mean value or a representative value. For example, an adjacent pair of imaging devices, such as imaging devices 8(1) and 8(2), may use the same correction data. This reduces the amount of black level correction data BC1 that must be stored in the black compensation data generating circuit 11.

The representative value mentioned above is one of the individual correction values, selected by some criterion. For a pair of pixels, for example, the higher value may be selected as the representative value, or the lower value may be selected, or the black level of the right or left imaging device 8 in the pair may be selected.

The corrected image data BK1 output from the black compensation circuit 9 are input to the sensitivity compensation circuit 10. The sensitivity compensation circuit 10 corrects the input image data BK1 in accordance with the sensitivity correction data WC1 generated by the sensitivity compensation data generating circuit 12 to correct for sensitivity variations in the imaging devices 8. The term 'sensitivity variations' as used here means variations in the dynamic range of the output signals of the imaging devices, that is, variation in the difference between the output signal level when light from the light source 7 reflects off a white document surface and enters the imaging device 8, and the output signal level when there is no light input. These sensitivity variations include the effect of variations in the amount of light from the light source 7.

The sensitivity compensation data generating circuit 12 holds the generated sensitivity correction data for the pixels included in one line and outputs the sensitivity correction data WC1 corresponding to each pixel of the image data BK1 input to the sensitivity compensation circuit 10. If $BK1(p)$ represents the black-level-corrected image data BK1 output by the black compensation circuit 9 for the pth pixel, $WC1(p)$ represents the sensitivity correction data WC1 generated by the sensitivity compensation data generating circuit 12 for the pth pixel, and $WH1(p)$ represents the sensitivity-corrected image data WH1 output by the sensitivity compensation circuit 10 for this pixel, the correction process performed by the sensitivity compensation circuit 10 can be expressed as follows:

$$WH1(p)=BK1(p)\times TG/WC1(p)$$

where TG is the gray-scale value representing white.

Figure 6A:
FIGS. 6(a) to 6(e) illustrate the operation of the sensitivity compensation circuit in FIG. 4.
Figure 6B:
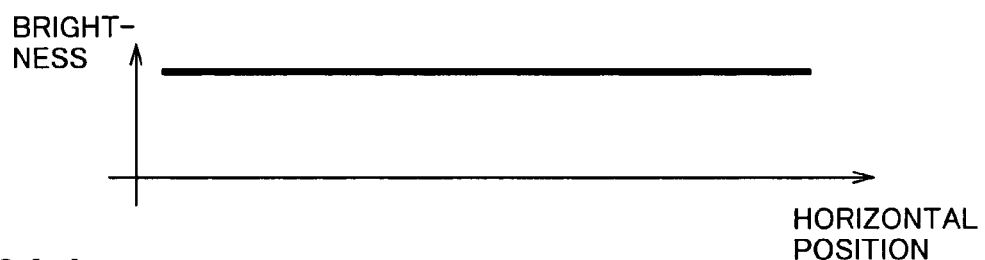
Figure 6C:
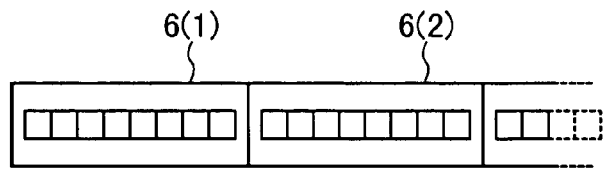
Figure 6D:
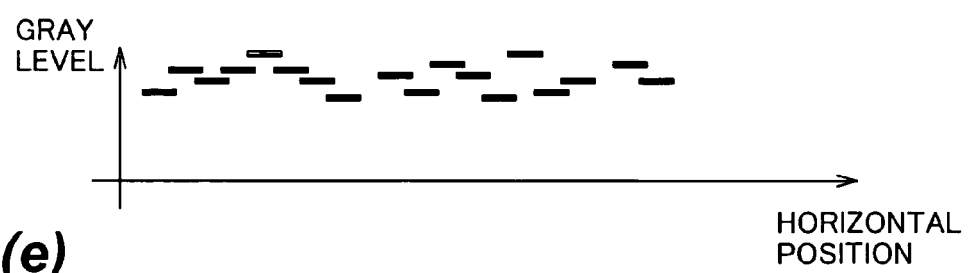
Figure 6E:
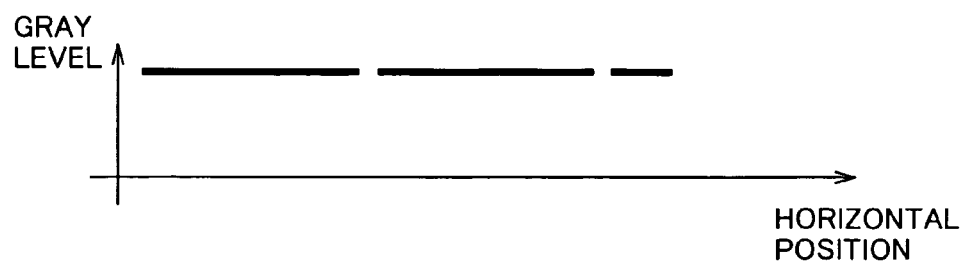

FIGS. 6(a) to 6(e) illustrate the concept of the correction operation performed by the sensitivity compensation circuit 10. FIG. 6(a) shows a white scanned image in which a series of white pixels extends in the main scanning direction (horizontal direction in the drawing) across at least the scanned width of the document at the indicated scanning position; FIG. 6(b) shows the brightness of the image at the scanning position shown in FIG. 6(a); FIG. 6(c) shows the positional relationship of the sensor chips to the scanned image in the horizontal direction (main scanning direction); FIG. 6(d)

shows black-level-corrected data indicating the brightness of the image scanned by the sensor chips; and FIG. 6(e) shows the corrected image data WH1 output by the sensitivity compensation circuit 10.

As shown in FIG. 6(d), the imaging devices 8 on the sensor chip 6 vary in their white data. The sensitivity compensation circuit 10 corrects for the variations and levels out the data obtained by scanning a white image. The sensitivity compensation data generating circuit 12 can generate the sensitivity correction data WC1 if the image data obtained by black-level correction of data scanned from a white reference image are created and stored beforehand. When the sensitivity correction processing of each imaging device 8 is performed, the data held in the sensitivity compensation data generating circuit 12 are supplied to the sensitivity compensation circuit 10 as WC1(p) in the equation shown above.

The correction process described above may be performed individually for each imaging device 8 (each pixel), or the sensitivity compensation circuit 10 may correct the pixel data from a plurality of imaging devices 8 by means of a single stored correction value, such as a mean value or a representative value. For example, an adjacent pair of imaging devices, such as imaging devices 8(1) and 8(2), may use the same correction data. This reduces the amount of sensitivity correction data WC1 that must be stored in the sensitivity compensation data generating circuit 12.

A representative value is, as above, a value selected by a certain criterion, such as, for a pair of pixels, the higher value, the lower value, the value of the left pixel in the pair, or the value of the right pixel.

Figure 7:
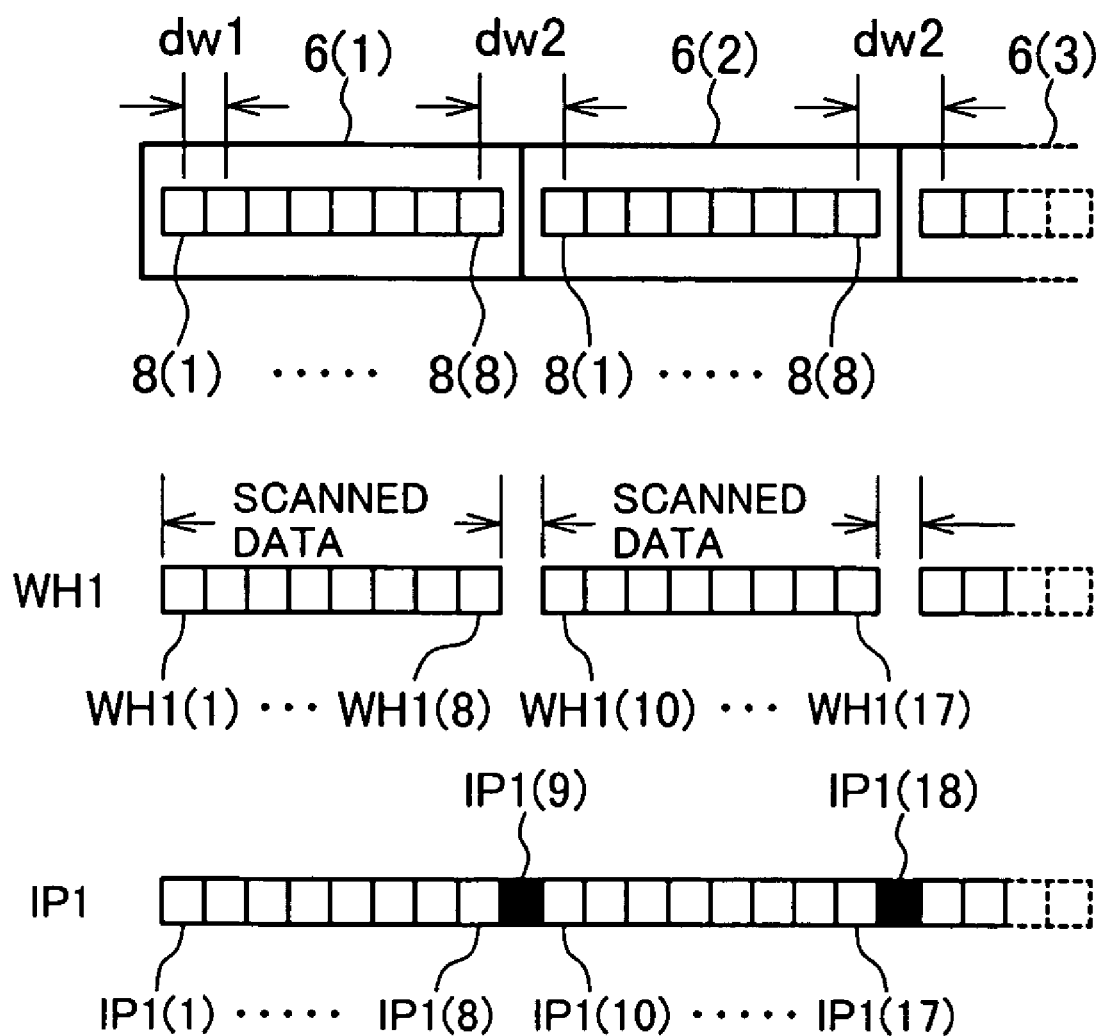
FIG. 7 shows the relationship between the imaging devices and missing pixels in the imager unit in FIG. 3.

The sensitivity compensation circuit 10 outputs the image data WH1 to the interpolator unit 4, where pixel data interpolation processing is performed. The interpolator unit 4 outputs image data IP1 including interpolated pixel data. The concept of the interpolation processing performed by the interpolator unit 4 will be described with reference to FIGS. 7 and 8. FIG. 7 schematically shows the relationship among the positions of the sensor chips 6 and the imaging devices 8 disposed on the sensor chips 6 in the main scanning direction, the image data WH1 for these positions, and the image data IP1. In FIG. 7, eight imaging devices 8 are disposed on each sensor chip 6, that is, b=8. In the drawing, WH(1) to WH(8) are pixel data corresponding to imaging devices 8(1) to on sensor chip 6(1), and WH1(10) to WH1(17) are pixel data corresponding to the imaging devices 8(1) to 8(8) on sensor chip 6(2). Imaging device 8(8) on sensor chip 6(1) and imaging device 8(1) on sensor chip 6(2) are separated by a distance of dw2, which is greater than dw1, and there is no imaging device corresponding to pixel data WH1(9). That is, it is assumed that the pixel corresponding to the pixel data WH1 (9) is missing. If dw2 is double dw1, for example, it is assumed that there is one missing pixel between imaging device 8(8) on sensor chip 6(1) and imaging device 8(1) on sensor chip 6(2).

The interpolator unit 4 obtains the missing pixel data WH1 (9) by an interpolation calculation and outputs interpolated image data IP1(9). The interpolator unit 4 performs the interpolation processing for each missing pixel between the sensor chips 6 and outputs image data IP1 without missing pixel data.

Figure 8A:
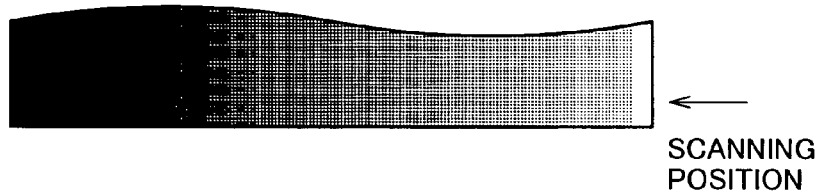
FIGS. 8(a) to 8(e) illustrate the concept of interpolation processing for the missing pixels shown in FIG. 7.
Figure 8B:
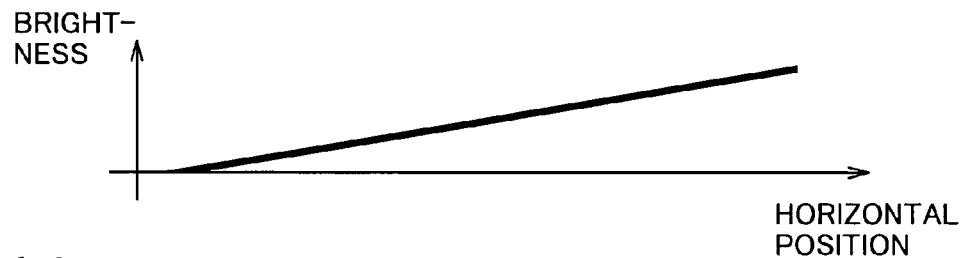
Figure 8C:
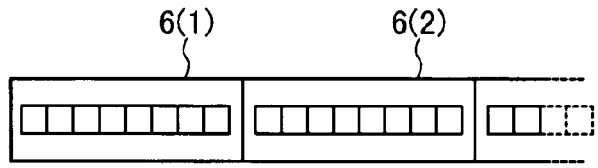
Figure 8D:
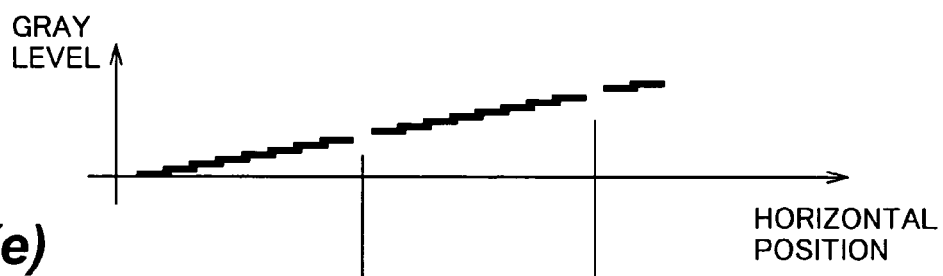
Figure 8E:
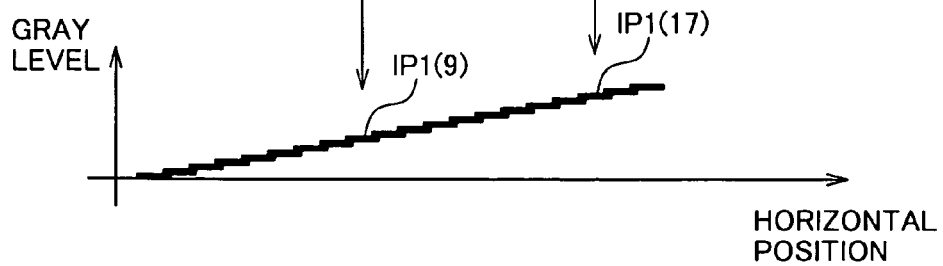

FIGS. 8(a) to 8(e) illustrate the operation of the interpolator unit 4 when it performs interpolation processing for a document that grades from black (left) to white (right) at the indicated scanning position in the main scanning direction (horizontal direction in the drawing). FIG. 8(a) shows the document; FIG. 8(b) shows the brightness of the document at the scanning position shown in FIG. 8(a); FIG. 8(c) shows the positional relationship between the document and the sensor chips 6 in the main scanning direction; FIG. 8(d) shows the brightness of the image data WH1 after processing of the image signal output by the sensor chips 6 shown in FIG. 8(c) by the A/D converter unit 2 and the compensator unit 3, with missing pixel data WH1(9) and WH1(17) as described earlier. FIG. 8(e) shows the result of interpolation processing of the image data shown in FIG. 8(d) by the interpolator unit 4. Interpolated data IP1(9) and IP1(17) replace the missing pixel data WH1(9) and WH1(17).

As shown in FIGS. 8(d) and 8(e), the interpolator unit 4 supplies missing pixel data between separated imaging devices 8 (between sensor chips 6) by interpolation.

In the description given above, dw2 is double dw1, but this is not the only possible case. The number of pixels interpolated may vary depending on the ratio of dw2 to dw1.

Detailed Description of the Interpolator Unit 4

The structure and operation of the interpolator unit 4 will now be described in further detail.

Figure 9:
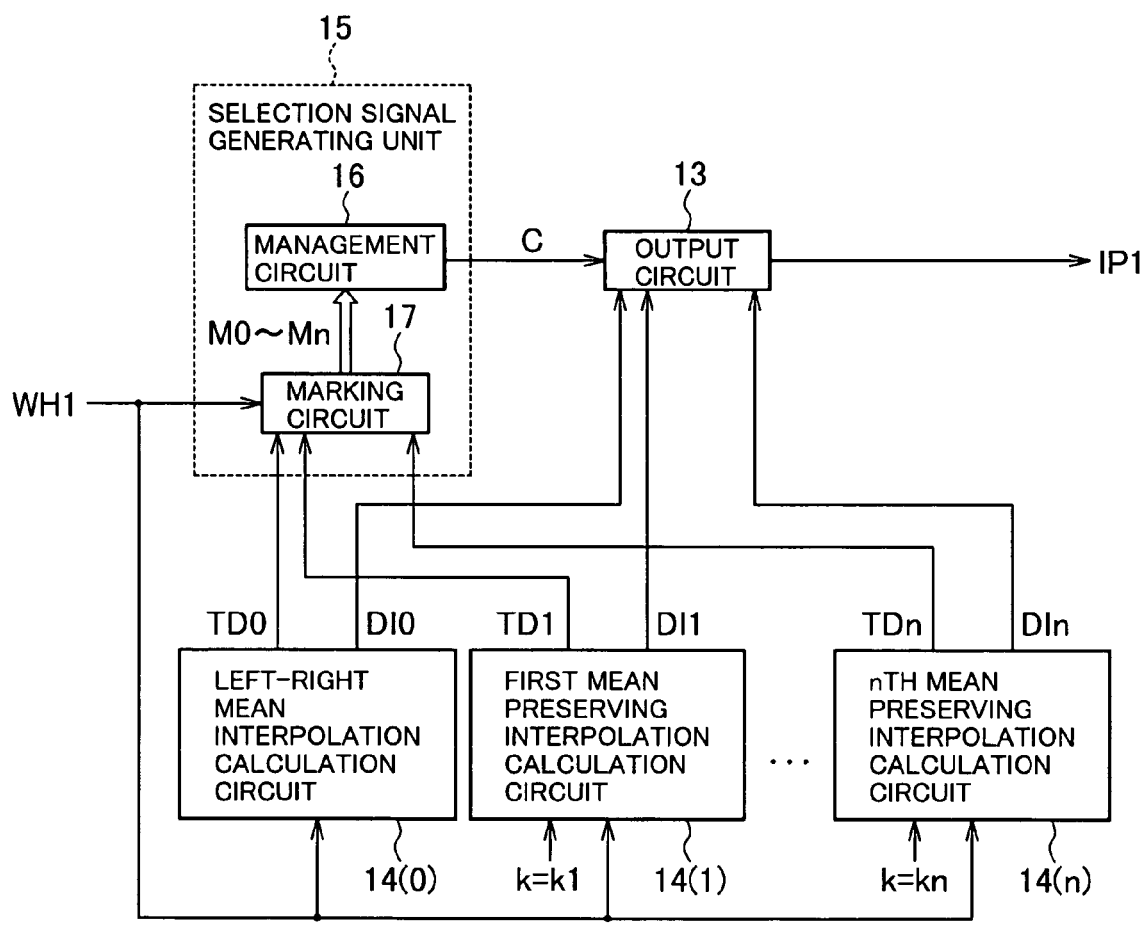
FIG. 9 is a block diagram showing details of the interpolator unit in FIG. 2.

FIG. 9 is a block diagram showing details of the interpolator unit 4 in the first embodiment.

The illustrated interpolator unit 4 includes a left-right mean interpolation calculation circuit 14(0), n first mean preserving interpolation calculation circuits 14(1) to 14(n), a selection signal generating unit 15, and an output circuit 13. The selection signal generating unit 15 includes a management circuit 16 and a marking circuit 17.

The image data WH1 are input to the left-right mean interpolation calculation circuit 14(0), to the n mean preserving interpolation calculation circuits, including the first mean preserving interpolation calculation circuit 14(1), the second mean preserving interpolation calculation circuit 14(2), and so on to the nth mean preserving interpolation calculation circuit 14(n), and to the marking circuit 17.

The left-right mean interpolation calculation circuit 14(0) outputs test interpolation data TD0 and interpolation data DI0 based on the image data WH1. The test interpolation data TD0 output from the left-right mean interpolation calculation circuit 14(0) are input to the marking circuit 17, and interpolation data DI0 are input to the output circuit 13.

The left-right mean interpolation calculation circuit 14(0) obtains the mean value of adjacent pixels to the right and left of the pixel to be interpolated, which may or may not be a missing pixel, and holds the value as interpolation data. The terms 'right' and 'left' refer to pixel positions in the horizontal direction, but if the series of pixel values is treated as time-series data, then 'right' and 'left' refer to the preceding and following pixel values.

Each of the n mean preserving interpolation calculation circuits 14(1) to 14(n) operates on pixels disposed in the vicinity of the pixel to be interpolated, e.g. the missing pixel, and obtains the data for the pixel to be interpolated by performing interpolation in such a manner that the mean value of a plurality of pixels including the pixel to be interpolated equals the mean value of a plurality of pixels not including the pixel to be interpolated. For example, interpolation may be performed so that the mean value of the pixel data of a pixel group comprising a certain number of pixels including the pixel to be interpolated equals the mean value of the pixel data of a pixel group comprising a certain number of pixels but not including the pixel to be interpolated.

Each pixel group may comprise a single sequence of pixels in the row with the missing pixel or may comprise multiple sequences of pixels disposed in different rows, including the row with the missing pixel.

The certain number of pixels including the pixel to be interpolated and the certain number of pixels not including the pixel to be interpolated are selected so as to overlap.

The first mean preserving interpolation calculation circuit 14(1) to the nth mean preserving interpolation calculation circuit 14(n) are supplied with parameters k1 to kn, respectively, as data specifying the certain number.

If the mean preserving interpolation calculation is performed to equalize the mean value of a group of pixels including the pixel to be interpolated and the mean value of another overlapping group of pixels not including the pixel to be interpolated, and if the overlap is kw pixels, the accuracy of the mean preserving interpolation calculation increases when the parameter k or the value of the difference k−w equals the pixel period Pd.

If the mean preserving interpolation calculation is performed to equalize the mean value of a group of pixels including the pixel to be interpolated and the mean value of another group of pixels not including the pixel to be interpolated and if the groups do not overlap, the accuracy of the mean preserving interpolation calculation increases when the parameter k equals the pixel period Pd.

The first mean preserving interpolation calculation circuit 14(1) outputs test interpolation data TD1 and interpolation data DI1 based on image data WH1 and parameter k=k1. Test interpolation data TD1 output from the first mean preserving interpolation calculation circuit 14(1) are input to the marking circuit 17, and interpolation data DI1 are input to the output circuit 13.

The second mean preserving interpolation calculation circuit 14(2) to the nth mean preserving interpolation calculation circuit 14(n) output test interpolation data TD1 to TDn and interpolation data DIn to DIn based on image data WH1 and parameters k=k2 to k=kn, respectively. The test interpolation data TD2 to TDn output from these mean preserving interpolation calculation circuits 14(2) to 14(n) are input to the marking circuit 17, and the interpolation data DI2 to DIn are input to the output circuit 13.

The marking circuit 17 marks the test interpolation data TD0 output from the left-right mean interpolation calculation circuit 14(0) with reference to image data WH1 (by comparison with the image data) and outputs the result as marking data M0. The marking circuit 17 outputs the marking data M0 to the management circuit 16.

The marking circuit 17 also marks the test interpolation data TD1 to TDn output from the first mean preserving interpolation calculation circuit 14(1) to the nth mean preserving interpolation calculation circuit 14(n) with reference to image data WH1 (by comparison with the image data) and outputs the result as marking data M1 to Mn. The marking circuit 17 outputs the marking data M1 to Mn to the management circuit 16.

The management circuit 16 evaluates the marking data M0 to Mn output from the marking circuit 17 and outputs a selection signal C in accordance with the result. The selection signal C output from the management circuit 16 is input to the output circuit 13. The marking data decrease in value as the difference between the test interpolation data and the image data decreases. For example, the absolute values of the differences between the test interpolation data and the image data may be summed for all the test pixels, and the sum total taken as the marking data. The interpolation calculation circuit with the smallest marking data is then selected as generating the best result, and a selection signal C that selects the output of this interpolation calculation circuit is generated.

The output circuit 13 selects one of interpolation data DI0 to DIn output from the left-right mean interpolation calculation circuit 14(0) and the first mean preserving interpolation calculation circuit 14(1) to the nth mean preserving interpolation calculation circuit 14(n) in accordance with the selection signal C output from the management circuit 16, and outputs the selected data as the output data IP1.

FIGS. 10(a) and 10(b) shows the image data WH1 two-dimensionally, with the horizontal direction corresponding to the horizontal direction of the image and the vertical direction corresponding to the vertical direction of the image. These drawings show m+1 pixels in each of three rows in a part of an image on one screen. A circle represents an existing pixel (non-missing pixel), and a cross represents a missing pixel.

Pixels T1 to Tm are specified as test pixels for missing pixel L (m=2k). A test pixel is a pixel positioned in the vicinity of a missing pixel. The test pixel is assumed to be missing, and interpolation data are generated for the test pixel. The test pixel may also be referred to as a non-missing test pixel. FIG. 10(a) shows a pair of one-dimensional sequences of k test pixels disposed to the left and right of the missing pixel L in the main scanning direction. In this example, the number of test pixels (k) matches parameter k, which is the number of pixels used for obtaining a mean value in the mean preserving interpolation calculation, but this is not a precondition.

The test pixels may be unevenly distributed on the right and left of the missing pixel, or may be located on just the right side or the left side. The test pixels may also be distributed two-dimensionally, as shown in FIG. 10(b). That is, both pixels in the same row as the missing pixel L and pixels in other rows may be specified as test pixels.

The operation of the left-right mean interpolation calculation circuit 14(0), the first mean preserving interpolation calculation circuit 14(1) to the nth mean preserving interpolation calculation circuit 14(n), and the marking circuit 17 with respect to test pixels T1 to Tm will be described with reference to FIGS. 9 and 10(a).

First, test pixel T1 is assumed to be missing, and the left-right mean interpolation calculation circuit 14(0) outputs test interpolation data TD0[T1] at the location of test pixel T1. More specifically, the left-right mean interpolation calculation circuit 14(0) obtains the mean value of the pixels adjacent to test pixel T1, and outputs the obtained value as the interpolation data for test pixel T1.

The marking circuit 17 obtains the absolute value of the difference between the value WH1[T1] of the image data WH1 (the output of the compensator unit 3) at the location of test pixel T1 and the value of test interpolation data TD0[T1], and outputs it as marking data M0[T1]. The marking data M0[T1] can be expressed as follows:

$$M0[T1]=|TD0[T1]-WH1[T1]|$$

Marking data M0[T1] having a small value show that the test interpolation data are similar to the input image, and that the calculation method of the left-right mean interpolation calculation circuit 14(0) is suitable for test pixel T1. Marking data M0[T1] having a large value show that the calculation method of the left-right mean interpolation calculation circuit 14(0) is unsuitable for test pixel T1. Marking data M0[T1] thus indicate the suitability of the left-right mean interpolation calculation circuit 14(0) for test pixel T1.

The left-right mean interpolation calculation circuit 14(0) next outputs test interpolation data TD0[T2] for test pixel T2 in the same way, assuming test pixel T2 to be missing. The marking circuit 17 obtains the absolute value of the difference between the value WH1[T2] of the image data WH1 at the location of test pixel T2 and the value of test interpolation data TD0[T2], and outputs it as marking data M0[T2]. The marking data M0[T2] can be expressed as follows:

$$M0[T2]=|TD0[T2]-WH1[T2]|$$

Marking data M0[T2] indicate the suitability of the left-right mean interpolation calculation circuit 14(0) for test pixel T2.

Similarly, the left-right mean interpolation calculation circuit 14(0) outputs test interpolation data TD0[T3] to TD0[Tm] for the remaining test pixels T3 to Tm. The marking circuit 17 obtains the absolute values of the differences between the values of test interpolation data TD0[T3] to TD0[Tm] and the values WH1[T3] to WH1[Tm] of the image data WH1 corresponding to each test interpolation result, and outputs the obtained values as marking data M0[T3] to M0[Tm]. The marking data M0[T3] to M0[Tm] can be expressed as follows:

$$M0[T3]=|TD0[T3]-WH1[T3]|$$

$$M0[Tm]=|TD0[Tm]-WH1[Tm]|$$

Marking data M0[T3] to M0[Tm] indicate the suitability of the left-right mean interpolation calculation circuit 14(0) for test pixels T3 to Tm.

The marking data relating to the test interpolation data for test pixels T1 to Tm output by the left-right mean interpolation calculation circuit 14(0) are obtained as described above.

In the same way, the first mean preserving interpolation calculation circuit 14(1) outputs test interpolation data TD1[T1] at the location of test pixel T1, assuming test pixel T1 to be missing. The first mean preserving interpolation calculation circuit 14(1) treats the value of the test pixel as unknown and performs interpolation by a calculation that determines a value for the test pixel such that the mean value of k=k1 pixels including the test pixel is equal to the mean value of k=k1 pixels not including the test pixel T1.

The marking circuit 17 obtains the absolute value of the difference between the value WH1[T1] of the image data WH1 at the location of test pixel T1 and the value of test interpolation data TD1[T1], and outputs it as marking data M1[T1]. The marking data M1[T1] can be expressed as follows:

$$M1[T1]=|TD1[T1]-WH1[T1]|$$

Marking data M1[T1] indicate the suitability of the first mean preserving interpolation calculation circuit 14(1) for test pixel T1.

Similarly, the first mean preserving interpolation calculation circuit 14(1) outputs test interpolation data TD1[T2] to TD1[Tm] for the remaining test pixels T2 to Tm. The marking circuit 17 obtains the absolute values of the differences between the values of test interpolation data TD1[T2] to TD1[Tm] and the values WH1[T2] to WH1[Tm] of the image data WH1 corresponding to each test interpolation result, and outputs the obtained values as marking data M1[T2] to M1[Tm]. Marking data M1[T2] to M1[Tm] can be expressed as follows:

$$M1[T2]=|TD1[T2]-WH1[T2]|$$

$$M1[Tm]=|TD1[Tm]-WH1[Tm]|$$

Marking data M1[T2] to M1[Tm] indicate the suitability of the first mean preserving interpolation calculation circuit 14(1) for test pixels T2 to Tm.

In the same way, the second mean preserving interpolation calculation circuit 14(2) to the nth mean preserving interpolation calculation circuit 14(n) output test interpolation data TD2[T1] ... TD2[Tm] to TDn[T1] ... TDn[Tm]; the marking circuit 17 outputs marking data M2[T1] ... M2[Tm] to Mn[T1] ... Mn[Tm] based on the test interpolation data TD2[T1] ... TD2[Tm] to TDn[T1] ... TDn[Tm].

The suitability of each of the interpolation calculation circuits, the left-right mean interpolation calculation circuit 14(0) and the first mean preserving interpolation calculation circuit 14(1) to the nth mean preserving interpolation calculation circuit 14(n), is thus determined for each of the test pixels T1 to Tm.

FIG. 11 is a table showing the marking data for each interpolation circuit with respect to test pixels T1 to Tm.

Using the absolute values of the differences between the values of the test interpolation data for the test pixels and the values of the image data WH1 at the locations of the test pixels makes it possible to indicate the suitability of the different interpolation methods for each test pixel.

The operation of the management circuit 16 will now be described.

The management circuit 16 evaluates the suitability of the left-right mean interpolation calculation circuit 14(0) in the neighborhood of the missing pixel by adding the values of marking data M0[T1] to M0[Tm] to generate score data S0 for the left-right mean interpolation calculation circuit 14(0). The score data S0 can be expressed as follows:

$$S0=M0[T1]+M0[T2]+\ldots+M0[Tm]$$

Score data S0 having a small value show that the calculation method of the left-right mean interpolation calculation circuit 14(0) is suitable in the neighborhood of the missing pixel. Score data S0 having a large value show that the calculation method of the left-right mean interpolation calculation circuit 14(0) is unsuitable in the neighborhood of the missing pixel.

Similarly, the management circuit 16 evaluates the suitability of the first mean preserving interpolation calculation circuit 14(1) to the nth mean preserving interpolation calculation circuit 14(n) in the neighborhood of the missing pixel by adding the values of marking data M1[T1] ... M1[Tm] to Mn[T1] ... Mn[Tm] to generate score data S1 to Sn for the first mean preserving interpolation calculation circuit 14(1) to the nth mean preserving interpolation calculation circuit 14(n). Score data S1 to Sn can be expressed as follows:

$$S1 = M1[T1] + M1[T2] + \ldots + M1[Tm]$$

$$\ldots$$

$$Sn = Mn[T1] + Mn[T2] + \ldots + Mn[Tm]$$

Figures 12, 13:
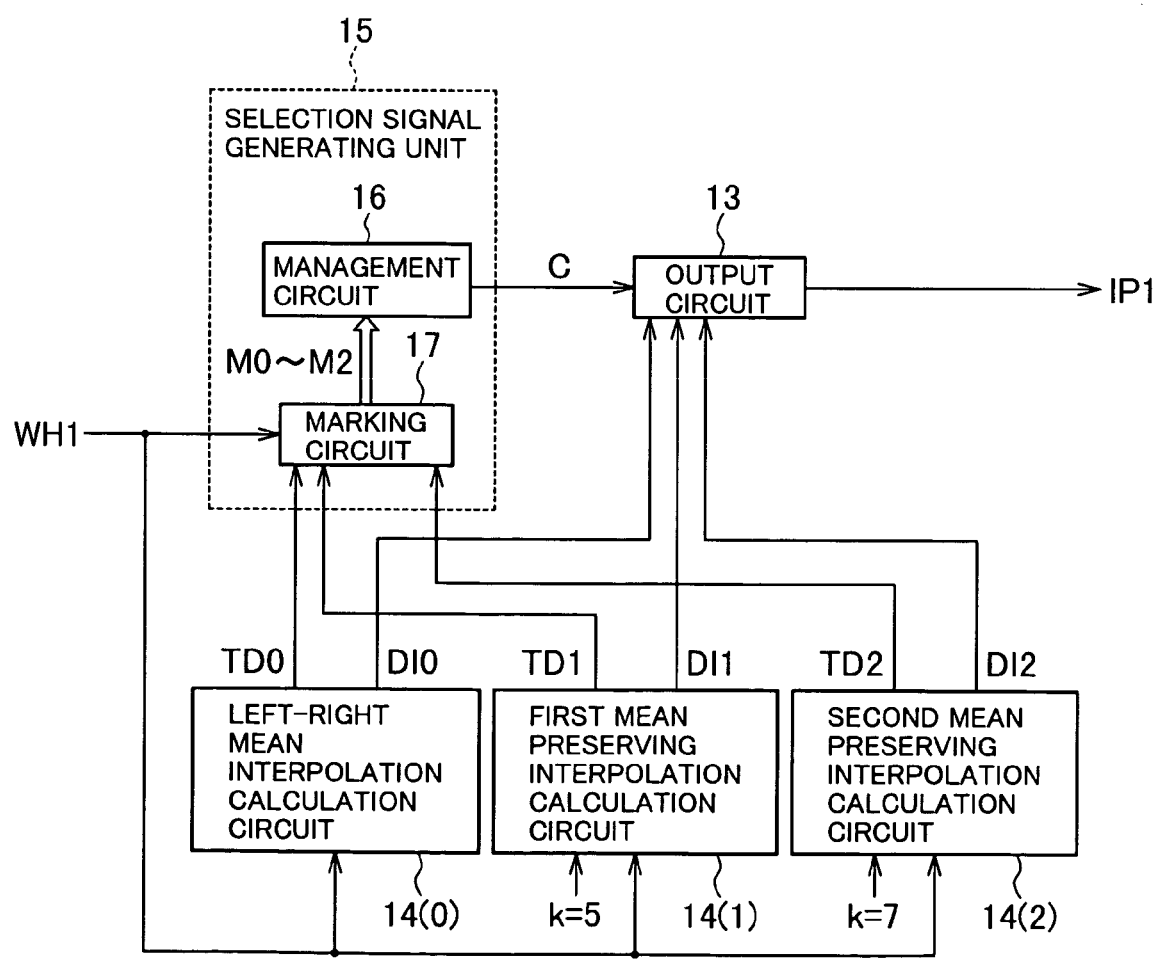
FIG. 12 is a table showing the total evaluation result of each interpolation calculation circuit in the interpolator unit of the image scanner according to the first embodiment.
FIG. 13 is a block diagram showing a specific example of the interpolator unit of an image scanner according to the first embodiment.

FIG. 12 is a table showing score data S0 to Sn.

Adding the values of the marking data for each test pixel makes it possible to indicate the suitability of the interpolation methods in the neighborhood of the missing pixel.

If the score data of an interpolation calculation circuit have a small value, then the interpolation calculation circuit can interpolate pixels properly in the neighborhood of the missing pixel, and by inference, it can also correctly carry out interpolation for the missing pixel. The management circuit 16 determines the content of the selection signal C so as to select the interpolation data output by the interpolation calculation circuit having the score data with the smallest value among the score data S0 to Sn.

The output circuit 13 selects one of the interpolation data DI0 to DIn output by the left-right mean interpolation calculation circuit 14(0) and the first mean preserving interpolation calculation circuit 14(1) to the nth mean preserving interpolation calculation circuit 14(*n*), in accordance with the selection signal C output from the management circuit 16, and select the selected data as output data IP1.

Interpolation data DI0 is obtained by the left-right mean interpolation calculation circuit 14(0), which calculates the mean value of the pixels to the left and right of the missing pixel L. Interpolation data DIy (y=1 to n) is obtained by the yth mean preserving interpolation calculation circuit 14(*n*), and the value of data is determined such that the mean value of k=ky pixels in the neighborhood of the missing pixel, including the missing pixel itself, and the mean value of k=ky pixels not including the missing pixel are equal.

The interpolator unit 4 shown in FIG. 9 marks the test interpolation data output by the left-right mean interpolation calculation circuit 14(0) and the first mean preserving interpolation calculation circuit 14(1) to the nth mean preserving interpolation calculation circuit 14(*n*) for the pixels in the neighborhood of the missing pixel, and evaluates the results to determine the interpolation calculation method suitable for the missing pixel; it is therefore possible to interpolate the missing pixel by using an interpolation method suitable for the image in the neighborhood of the missing pixel.

A specific example will be described below.

FIG. 13 shows a structure in which a first mean preserving interpolation calculation circuit with parameter k set to five (k=5) and a second mean preserving interpolation calculation circuit with parameter k set to seven (k=7) constitute the plurality of mean preserving interpolation calculation circuits in FIG. 9.

The structure of the interpolator unit 4 will be described through the specific example in FIG. 13.

The interpolator unit 4 in FIG. 13 has an output circuit 13, a left-right mean interpolation calculation circuit 14(0), a first mean preserving interpolation calculation circuit 14(1), a second mean preserving interpolation calculation circuit 14(2), a management circuit 16, and a marking circuit 17.

Image data WH1 are input to the left-right mean interpolation calculation circuit 14(0), the first mean preserving interpolation calculation circuit 14(1), the second mean preserving interpolation calculation circuit 14(2), and the marking circuit 17. The left-right mean interpolation calculation circuit 14(0) outputs interpolation data TD0 and interpolation data DI0 based on the image data WH1. For each test pixel, the left-right mean interpolation calculation circuit 14(0) calculates the mean value of the pixels to the left and right of the test pixel, outputs test interpolation data TD0, calculates the mean value of the pixel to the left and right of the missing pixel, and outputs interpolation data DI0. The test interpolation data TD0 output by the left-right mean interpolation calculation circuit 14(0) are input to the marking circuit 17; the interpolation data DI0 are input to the output circuit 13.

A parameter k equal to five (k=5) is input to the first mean preserving interpolation calculation circuit 14(1). The first mean preserving interpolation calculation circuit 14(1) outputs interpolation data TD1 and interpolation data DI1 based on the image data WH1 and the parameter k set to five. Specifically, for each test pixel, it treats the value of the test pixel as unknown, determines a value for the test pixel such that the mean value of five (k=5) pixels in the neighborhood of the test pixel, including the test pixel itself, and the mean value of five pixels not including the test pixel are equal and outputs test interpolation data TD1; similarly, it determines a value for the missing pixel such that the mean value of five pixels in the neighborhood of the missing pixel, including the test pixel itself, and the mean value of five pixels not including the missing pixel are equal and outputs interpolation data DI1. The test interpolation data TD1 output by the mean preserving interpolation calculation circuit 14(1) are input to the marking circuit 17; the interpolation data DI1 are input to the output circuit 13.

A parameter k equal to seven (k=7) is input to the second mean preserving interpolation calculation circuit 14(2). The second mean preserving interpolation calculation circuit 14(2) outputs interpolation data TD2 and interpolation data DI2 based on the image data WH1 and the parameter k set to seven. Specifically, for each test pixel, it treats the value of the test pixel as unknown, determines a value for the test pixel such that the mean value of seven (k=7) pixels in the neighborhood of the test pixel, including the test pixel itself, and the mean value of seven pixels not including the test pixel are equal and outputs test interpolation data TD2; similarly, it determines a value for the missing pixel such that the mean value of seven pixels in the neighborhood of the missing pixel, including the test pixel itself, and the mean value of seven pixels not including the missing pixel are equal and outputs interpolation data DI2. The test interpolation data TD2 output by the second mean preserving interpolation calculation circuit 14(2) are input to the marking circuit 17; the interpolation data DI2 are input to the output circuit 13.

The marking circuit 17 marks the test interpolation data TD0 output by the left-right mean interpolation calculation circuit 14(0) based on the image data WH1, and outputs the result as marking data M0.

The marking circuit 17 marks the test interpolation data TD1 output by the first mean preserving interpolation calculation circuit 14(1) based on the image data WH1, and outputs the result as marking data M1.

The marking circuit 17 marks the test interpolation data TD2 output by the second mean preserving interpolation calculation circuit 14(2) based on the image data WH1, and outputs the result as marking data M2. The marking data M0 to M2 output by the marking circuit 17 are input to the management circuit 16.

The management circuit 16 outputs a selection signal C based on the marking data M0 to M2 output by the marking circuit 17. The selection signal C output by the management circuit 16 is input to the output circuit 13.

The output circuit 13 selects one of the interpolation data DI0 to DI2 output by the left-right mean interpolation calculation circuit 14(0), the first mean preserving interpolation calculation circuit 14(1), and the second mean preserving interpolation calculation circuit 14(2) according to the selection signal C output by the management circuit 16, and outputs the selected data as output data IP1.

Figure 14A:
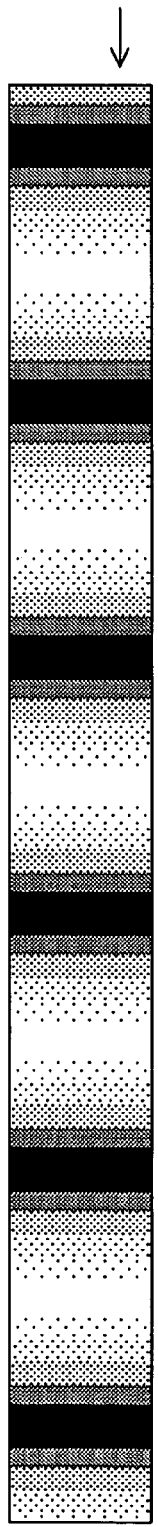
FIGS. 14(a) to 14(c) show exemplary pixel data processed in the interpolator unit of the image scanner according to the first embodiment.
Figure 14B:
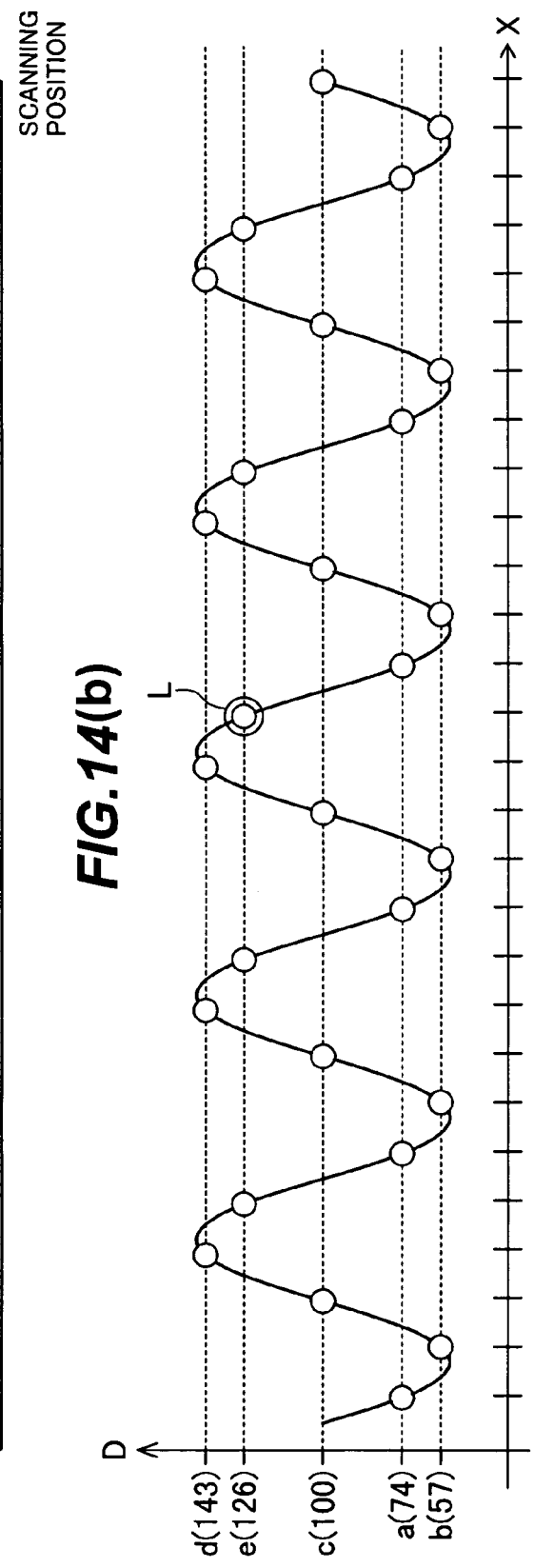
Figure 14C:
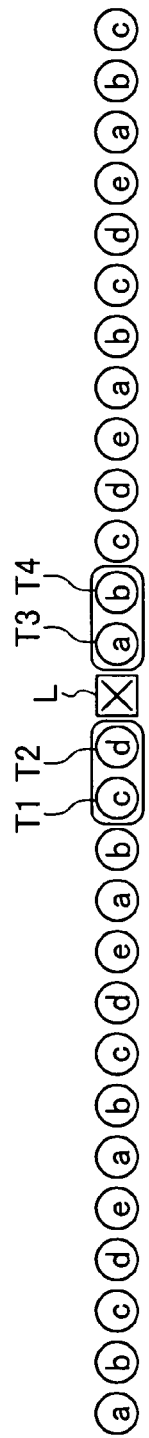

FIGS. 14(*a*) and 14(*b*) show exemplary periodic image data. In FIG. 14(*a*) the same image as a fixed period Pd in the horizontal direction (the main scanning direction); FIG. 14(*b*) indicates the density (or brightness) at each position in the horizontal direction in the scanning position shown in FIG. 14(*a*). The horizontal axis X in FIG. 14(*b*) indicates pixel position, the vertical axis D indicates density. The solid line in FIG. 14(*b*) indicates the brightness of the image in FIG. 14(*a*); the white circles indicate the values are the values obtained when the image in FIG. 14(*a*) is sampled at a sampling frequency Ps (Ps=Pd/5).

Since Pd=5Ps in FIG. 14(*b*), the pixel period Pp of the image data is five (Pp=Pd/Ps=5). The pixel period Pp is the number of samples per period. The values of the sampled pixels repeat the data 74, 57, 100, 143, and 126 (a=74, b=57, c=100, d=143, e=126) in each period Pd. FIG. 14(*c*) illustrates the positional relationship between the missing pixel and the test pixels. Test pixels T1 to T4 corresponding to the missing pixel L are positioned one dimensionally, two pixels each on the left and right of the missing pixel L.

Figure 15A:
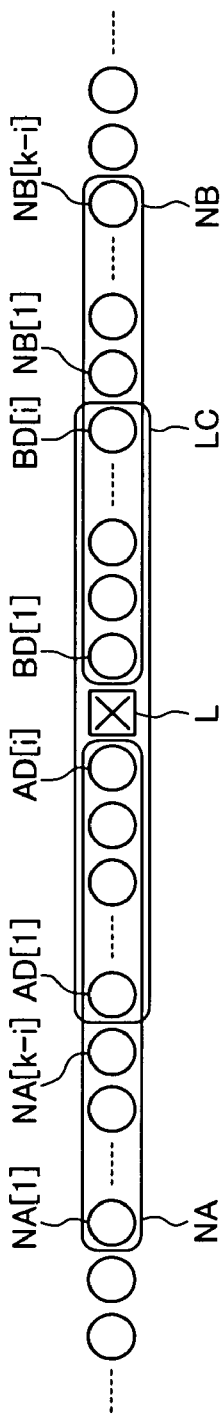
FIGS. 15(a) to 15(c) illustrate pixel sequences processed in the interpolator unit of the image scanner according to the first embodiment.
Figure 15B:
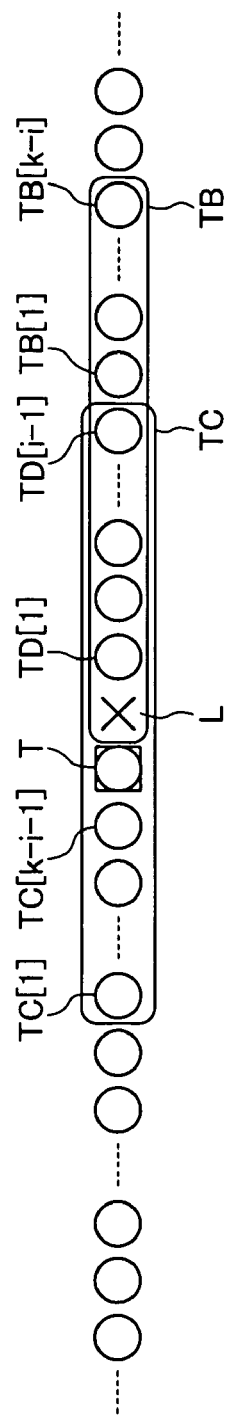
Figure 15C:
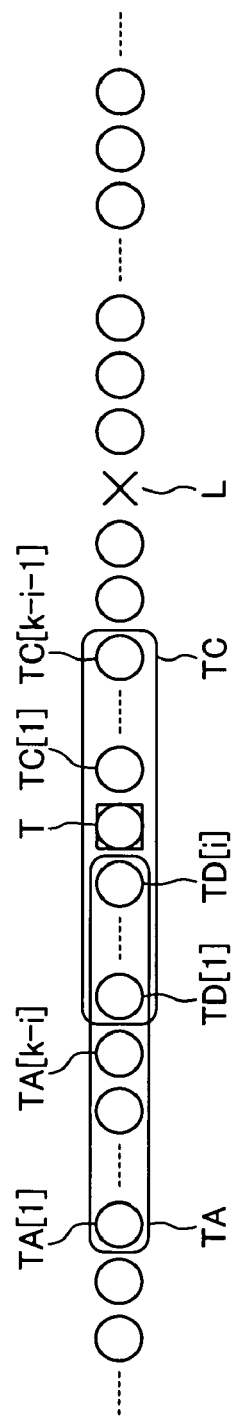

FIGS. 15(a) to 15(c) illustrate test interpolation by the mean preserving interpolation calculation circuit 14.

FIG. 15(a) illustrates the positional relationships among the pixel sequence LC including the missing pixel and the pixel sequences NA and NB not including the missing pixel. FIG. 15(b) indicates the plurality of pixels used when test interpolation is carried out on a test pixel T which is regarded treated as if it were missing, showing the positional relation of a pixel sequence TC comprising a plurality of pixels, including the test pixel T and the missing pixel L, and a pixel sequence TB comprising a plurality of pixels including the missing pixel L but not including the test pixel T. FIG. 15(c) shows the positional relationship of a pixel sequence TC comprising a plurality of pixels, including the test pixel T but not the missing pixel L, and a pixel sequence TA comprising a plurality of pixels including neither the missing pixel L nor the test pixel T.

Test interpolation by the mean preserving interpolation calculation circuit will now be described.

When the mean preserving interpolation calculation circuits 14(1) and 14(2) perform test interpolation on a non-missing test pixel near the missing pixel, it is necessary to change the interpolation method according to the position of the missing pixel. In test interpolation, only one of the two pixel sequences not including the test pixel is used.

When the missing pixel L is included in the pixel sequence TC including the test pixel T as shown in FIG. 15(b), the mean preserving interpolation calculation circuits 14(1) and 14(2) need to generate an equation taking into account the missing pixel L. If the pixel sequence TB not including the test pixel T is positioned to include the missing pixel L so that the missing pixel is included in both the pixel sequence TC with the test pixel and the pixel sequence TB without the test pixel, the value of the missing pixel cancels out in the equation, and accordingly the test interpolation data for the test pixel T can be obtained correctly. The equation is:

$$(TC[1]+\ldots+TC[k-i-1]+T+L+TD[1]+\ldots+TD[i-1])/k =$$
$$(L+TD[1]+\ldots+TD[i-1]+TB[1]+\ldots+TB[k-i])/k$$

The value given to the test pixel T is:

$$T=(TB[1]+\ldots+TB[k-i])-(TC[1]+\ldots+TC[k-i-1])$$

When the missing pixel L is not included in the pixel sequence TC including the test pixel as shown in FIG. 15(c), the pixel sequences are positioned so that the pixel sequence TA not including the test pixel also does not include the missing pixel. The equation generated in the mean preserving interpolation calculation circuit is:

$$(TA[1]+\ldots+TA[k-i]+TD[1]+\ldots+TD[i])/k =$$
$$(TD[1]+\ldots+TD[i]+T+TC[1]+\ldots+TC[k-i-1])$$

The value given to the test pixel T is:

$$T=(TA[1]+\ldots+TA[k-i])-(TC[1]+\ldots+TC[k-i-1])$$

Thus, each mean preserving interpolation calculation circuit can be correctly marked by using test interpolation methods that take into account the position of the missing pixel.

Figure 16A:
FIGS. 16(a) to 16(e) show missing pixels and the neighboring test pixels in a series of pixels processed in the interpolator unit of the image scanner according to the first embodiment.
Figure 16B:
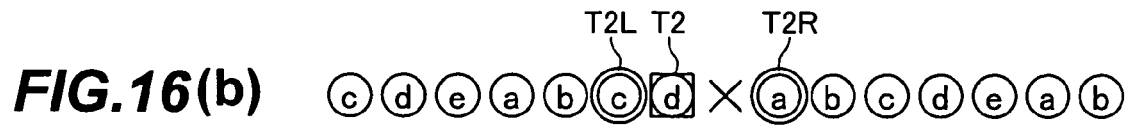
Figure 16C:
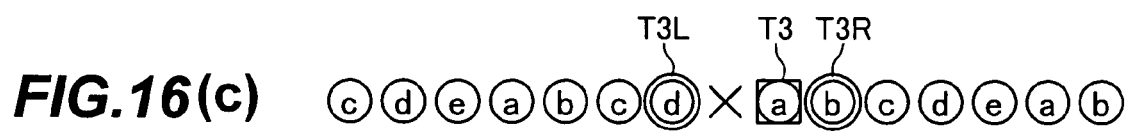
Figure 16D:
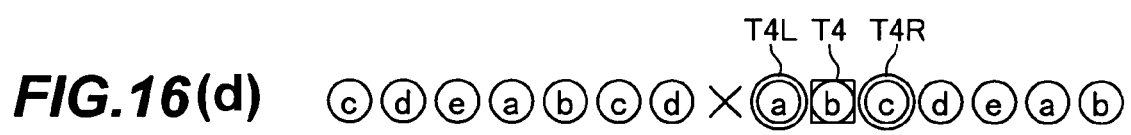
Figure 16E:
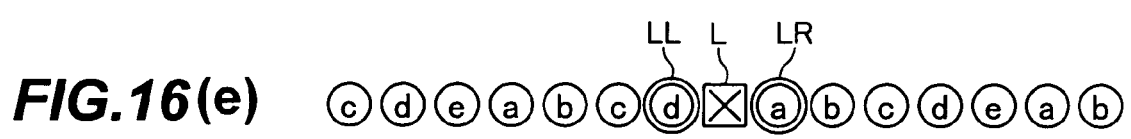
Figure 17A:
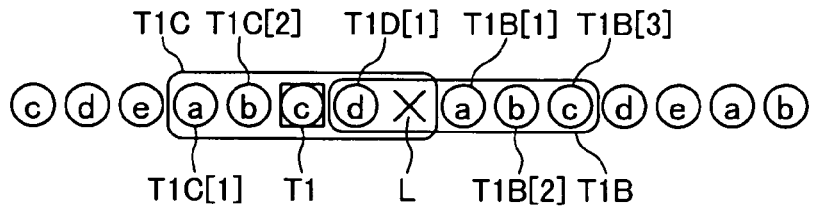
FIGS. 17(a) to 17(e) show missing pixels and the neighboring test pixels in a series of pixels processed in the interpolator unit of the image scanner according to the first embodiment.
Figure 17B:
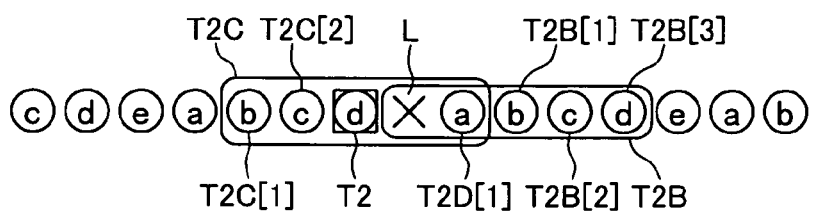
Figure 17C:
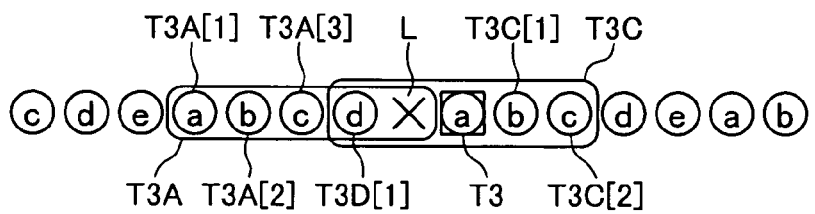
Figure 17D:
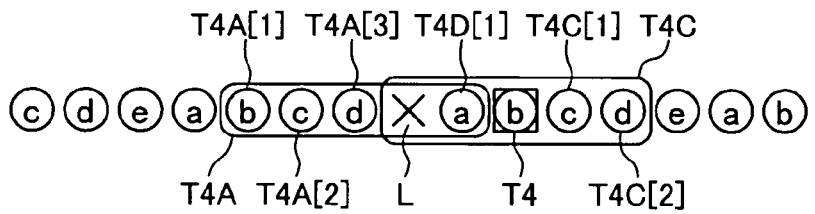
Figure 17E:
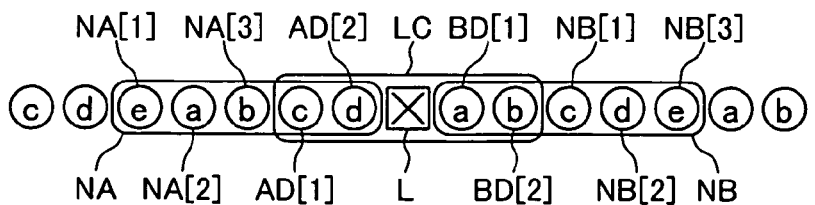

FIGS. 16(a) to 16(e) illustrate the operation of the left-right mean interpolation calculation circuit 14(0) and the marking circuit 17 with respect to test pixels T1 to T4 and the missing pixel L. FIG. 16(a) illustrates the calculation of test interpolation data for T1 in the left-right mean interpolation calculation circuit 14(0); FIG. 16(b) illustrates the calculation of test interpolation data for T2 in the left-right mean interpolation calculation circuit 14(0); FIG. 16(c) illustrates the calculation of test interpolation data for T3 in the left-right mean interpolation calculation circuit 14(0); FIG. 16(d) illustrates the calculation of test interpolation data for T4 in the left-right mean interpolation calculation circuit 14(0); and FIG. 16(e) illustrates the calculation of test interpolation data for the missing pixel L in the left-right mean interpolation calculation circuit 14(0).

The operation of the left-right mean interpolation calculation circuit 14(0) and the marking circuit 17 with respect to test pixels T1 to T4 and the missing pixel L will now be described.

The left-right mean interpolation calculation circuit 14(0) outputs the mean value of pixels T1L and T1R, shown in FIG. 16(a), as test interpolation data TD0[T1] for test pixel T1. From T1L=b=57 and T1R=d=143, it follows that the value of test interpolation data TD0[T1] is:

$$TD0[T1]=(T1L+T1R)/2=(57+143)/2=100$$

The marking circuit 17 outputs the absolute value of the difference between the value WH1[T1] of the image data WH1 at the location of test pixel T1 and the value of test interpolation data TD0[T1] as marking data M0[T1]. From TD0[T1]=100 and WH1[T1]=c=100, it follows that the value of marking data M0 [T1] is:

$$M0[T1]=|TD0[T1]-WH1[T1]|=|100-100|=0$$

The left-right mean interpolation calculation circuit 14(0) outputs the mean value of pixels T2L and T2R, shown in FIG. 16(b), as test interpolation data TD0[T2] for test pixel T2. From T2L=c=100 and T2R=a=74, it follows that the value of test interpolation data TD0[T2] is:

$$TD0[T2]=(T2L+T2R)/2=(100+74)/2=87$$

The marking circuit 17 outputs the absolute value of the difference between the value WH1[T2] of the image data WH1 at the location of test pixel T2 and the value of test interpolation data TD0[T2] as marking data M0[T2]. From TD0[T2]=87 and WH1[T2]=d=143, it follows that the value of marking data M0[T2] is:

$$M0[T2]=|TD0[T2]-WH1[T2]|=|87-143|=56$$

The left-right mean interpolation calculation circuit 14(0) outputs the mean value of pixels T3L and T3R, shown in FIG. 16(c), as test interpolation data TD0[T3] for test pixel T3. From T3L=d=143 and T3R=b=57, it follows that the value of test interpolation data TD0[T3] is:

$$TD0[T3]=(T3L+T3R)/2=(143+57)/2=100$$

The marking circuit 17 outputs the absolute value of the difference between the value WH1[T3] of the image data WH1 at the location of test pixel T3 and the value of test interpolation data TD0[T3] as marking data M0[T3]. From TD0[T3]=100 and WH1[T3]=a=74, it follows that the value of marking data M0[T3] is:

$$M0[T3]=|TD0[T3]-WH1[T3]|=|100-74|=26$$

The left-right mean interpolation calculation circuit 14(0) outputs the mean value of pixels T4L and T4R, shown in FIG.

16(*d*), as test interpolation data TD0[T4] for test pixel T4. From T4L=a=74 and T4R=c=100, it follows that the value of test interpolation data TD0[T4] is:

$$TD0[T4]=(T4L+T4R)/2=(74+100)/2=87$$

The marking circuit 17 outputs the absolute value of the difference between the value WH1[T4] of the image data WH1 at the location of test pixel T4 and the value of test interpolation data TD0[T4] as marking data M0[T4]. From TD0[T4]=87 and WH1[T4]=b=57, it follows that the value of marking data M0[T4] is:

$$M0[T4]=|TD0[T4]-WH1[T4]|=|87-57|=30$$

The left-right mean interpolation calculation circuit 14(0) outputs the mean value of the pixels LL and LR adjacent to the missing pixel L, shown in FIG. 16(*e*), as interpolation data DI0 for the missing pixel L. From LL=d=143 and LR=a=74, the value of interpolation data DI0 is:

$$DI0=(LL+LR)/2=(143+74)/2=108.5$$

FIGS. 17(*a*) to 17(*e*) illustrate the operation of the first mean preserving interpolation calculation circuit 14(1) and the marking circuit 17 with respect to test pixels T1 to T4 and the missing pixel L. FIG. 17(*a*) illustrates the calculation of test interpolation data for T1 in the first mean preserving interpolation calculation circuit 14(1); FIG. 17(*b*) illustrates the calculation of test interpolation data for T2 in the first mean preserving interpolation calculation circuit 14(1); FIG. 17(*c*) illustrates the calculation of test interpolation data for T3 in the first mean preserving interpolation calculation circuit 14(1); FIG. 17(*d*) illustrates the calculation of test interpolation data for T4 in the first mean preserving interpolation calculation circuit 14(1); and FIG. 17(*e*) illustrates the calculation of test interpolation data for the missing pixel L in the first mean preserving interpolation calculation circuit 14(1).

The operation of the first mean preserving interpolation calculation circuit 14(1) and the marking circuit 17 with respect to test pixels T1 to T4 and the missing pixel L will now be described.

As shown in FIG. 17(*a*), the first mean preserving interpolation calculation circuit 14(1) obtains test interpolation data TD1[T1] for test pixel T1 such that the mean value of the pixel sequence T1C including the test pixel T1 is equal to the mean value of the pixel sequence T1B not including the test pixel T1. From the equation $$(T1C[1]+T1C[2]+TD1[T1]+T1D[1]+L)/5=$$
$$(T1D[1]+L+T1B[1]+T1B[2]+T1B[3])/5$$

it follows that the value of test interpolation data TD1[T1] is:

$$TD1[T1]=(T1B[1]+T1B[2]+T1B[3])-(T1C[1]+T1C[2])$$

From T1C[1]=a=74, T1C[2]=b=57, T1B[1]=a=74, T1B[2]=b=57, and T1B[3]=c=100, it follows that:

$$TD1[T1]=(74+57+100)-(74+57)=100$$

The marking circuit 17 outputs the absolute value of the difference between the value WH1[T1] of the image data WH1 at the location of test pixel T1 and the value of test interpolation data TD1[T1] as marking data M1[T1]. From TD1[T1]=100 and WH1[T1]=c=100, it follows that the value of marking data M1[T1] is:

$$M1[T1]=|TD1[T1]-WH1[T1]|=|100-100|=0$$

As shown in FIG. 17(*b*), the first mean preserving interpolation calculation circuit 14(1) obtains test interpolation data TD1[T2] for test pixel T2 such that the mean value of the pixel sequence T2C including the test pixel T2 is equal to the mean value of the pixel sequence T2B not including the test pixel T2. From the equation $$(T2C[1]+T2C[2]+TD1[T2]+L+T2D[1])/5=$$
$$(L+T2D[1]+T2B[1]+T2B[2]+T2B[3])/5$$

it follows that the value of test interpolation data TD1[T2] is:

$$TD1[T2]=(T2B[1]+T2B[2]+T2B[3])-(T2C[1]+T2C[2])$$

From T2C[1]=b=57, T2C[2]=c=100, T2B[1]=b=57, T2B[2]=c=100, and T2B[3]=d=143, it follows that:

$$TD1[T2]=(57+100+143)-(57+100)=143$$

The marking circuit 17 outputs the absolute value of the difference between the value WH1[T2] of the image data WH1 at the location of test pixel T2 and the value of test interpolation data TD1[T2] as marking data M1[T2]. From TD1[T2]=143 and WH1[T2]=d=143, it follows that the value of marking data M1[T2] is:

$$M1[T2]=|TD1[T2]-WH1[T2]|=|143-143|=0$$

As shown in FIG. 17(*c*), the first mean preserving interpolation calculation circuit 14(1) obtains test interpolation data TD1[T3] for test pixel T3 such that the mean value of the pixel sequence T3C including the test pixel T3 is equal to the mean value of the pixel sequence T3A not including the test pixel T3. From the equation $$(T3A[1]+T3A[2]+T3A[3]+T3D[1]+L)/5=$$
$$(T3D[1]+L+TD1[T3]+T3C[1]+T3C[2])/5$$

it follows that the value of test interpolation data TD1[T3] is:

$$TD1[T3]=(T3A[1]+T3A[2]+T3A[3])-(T3C[1]+T3C[2])$$

From T3C[1]=b=57, T3C[2]=c=100, T3A[1]=a=74, T3A[2]=b=57, and T3A[3]=c=100, it follows that:

$$TD1[T3]=(74+57+100)-(57+100)=74$$

The marking circuit 17 outputs the absolute value of the difference between the value WH1[T3] of the image data WH1 at the location of test pixel T3 and the value of test interpolation data TD1[T3] as marking data M1[T3]. From TD1[T3]=74 and WH1[T3]=a=74, it follows that the value of marking data M1[T3] is:

$$M1[T3]=|TD1[T3]-WH1[T3]|=|74-74|=0$$

As shown in FIG. 17(*d*), the first mean preserving interpolation calculation circuit 14(1) obtains test interpolation data TD1[T4] for test pixel T4 such that the mean value of the pixel sequence T4C including the test pixel T4 is equal to the mean value of the pixel sequence T4A not including the test pixel T4. From the equation $$(T4A[1] + T4A[2] + T4A[3] + L + T4D[1])/5 =$$
$$(L + T4D[1] + TD1[T4] + T4C[1] + T4C[2])/5$$

it follows that the value of test interpolation data TD1[T4] is:

$$TD1[T4]=(T4A[1]+T4A[2]+T4A[3])-(T4C[1]+T4C[2])$$

From T4C[1]=c=100, T4C[2]=d=143, T4A[1]=b=57, T4A[2]=c=100, and T4A[3]=d=143, it follows that:

$$TD1[T1]=(57+100+143)-(100+143)=57$$

The marking circuit 17 outputs the absolute value of the difference between the value WH1[T4] of the image data WH1 at the location of test pixel T4 and the value of test interpolation data TD1[T4] as marking data M1[T4]. From TD1[T4]=57 and WH1[T4]=b=57, it follows that the value of marking data M1[T4] is:

$$M1[T4]=|TD1[T4]-WH1[T4]|=|57-57|=0$$

As shown in FIG. 17(*e*), the first mean preserving interpolation calculation circuit 14(1) obtains interpolation data DI1 for the missing pixel L such that the mean value of the pixel sequence LC including the missing pixel L is equal to the mean value of the pixel sequences NA and NB not including the missing pixel L. From the equation $$(AD[1] + AD[2] + DI1 + BD[1] + BD[2])/5 =$$
$$((NA[1] + NA[2] + NA[3] + AD[1] + AD[2])/5 +$$
$$(BD[1] + BD[2] + NB[1] + NB[2] + NB[3])/5)/2$$

it follows that the value of interpolation data DI1 is:

$$DI1 = ((NA[1] + NA[2] + NA[3] + AD[1] + AD[2]) +$$
$$(BD[1] + BD[2] + NB[1] + NB[2] + NB[3]))/2 -$$
$$(AD[1] + AD[2] + BD[1] + BD[2])$$

From NA[1]=e=126, NA[2]=a=74, NA[3]=b=57, AD[1]=c=100, AD[2]=d=143, BD[1]=a=74, BD[2]=b=57, NB[1]=c=100, NB[2]=d=143, and NB[3]=e=126, it follows that:

$$DI1 = ((126 + 74 + 57 + 100 + 143) + (74 + 57 + 100 + 143 + 126))/2 -$$
$$(100 + 143 + 74 + 57) = 126$$

FIGS. 18(*a*) to 18(*e*) illustrate the operation of the second mean preserving interpolation calculation circuit 14(2) and the marking circuit 17 with respect to test pixels T1 to T4 and the missing pixel L. FIG. 18(*a*) illustrates the calculation of test interpolation data for T1 in the second mean preserving interpolation calculation circuit 14(2); FIG. 18(*b*) illustrates the calculation of test interpolation data for T2 in the second mean preserving interpolation calculation circuit 14(2); FIG. 18(*c*) illustrates the calculation of test interpolation data for T3 in the second mean preserving interpolation calculation circuit 14(2); FIG. 18(*d*) illustrates the calculation of test interpolation data for T4 in the second mean preserving interpolation calculation circuit 14(2); and FIG. 18(*e*) illustrates the calculation of test interpolation data for the missing pixel L in the second mean preserving interpolation calculation circuit 14(2).

The operation of the second mean preserving interpolation calculation circuit 14(2) and the marking circuit 17 with respect to test pixels T1 to T4 and the missing pixel L will now be described.

As shown in FIG. 18(*a*), the second mean preserving interpolation calculation circuit 14(2) obtains test interpolation data TD2[T1] for test pixel T1 such that the mean value of the pixel sequence T1C including the test pixel T1 is equal to the mean value of the pixel sequence T1B not including the test pixel T1. From the equation $$(T1C[1]+T1C[2]+T1C[3]+TD2[T1]+T1D[1]+L+T1D[2])/7=(T1D[1]+L+T1D[2]+T1B[1]+T1B[2]+T1B[3]+T1B[4])/7$$

it follows that the value of test interpolation data TD2[T1] is:

$$TD2[T1] =$$
$$(T1B[1] + T1B[2] + T1B[3] + T1B[4]) - (T1C[1] + T1C[2] + T1C[3])$$

From T1C[1]=e=126, T1C[2]=a=74, T1C[3]=b=57, T1B[1]=b=57, T1B[2]=c=100, T1B[3]=d=143, and T1B[4]=e=126, it follows that:

$$TD2[T1]=(57+100+143+126)-(126+74+57)=169$$

The marking circuit 17 outputs the absolute value of the difference between the value WH1[T1] of the image data WH1 at the location of test pixel T1 and the value of test interpolation data TD2[T1] as marking data M2[T1]. From TD2[T1]=169 and WH1[T1]=c=100, it follows that the value of marking data M2[T1] is:

$$M2[T1]=|TD2[T1]-WH1[T1]|=|169-100|=69$$

As shown in FIG. 18(*b*), the second mean preserving interpolation calculation circuit 14(2) obtains test interpolation data TD2[T2] for test pixel T2 such that the mean value of the pixel sequence T2C including the test pixel T2 is equal to the mean value of the pixel sequence T2B not including the test pixel T2. From the equation $$(T2C[1]+T2C[2]+T2C[3]+TD2[T2]+L+T2D[1]+T2D[2])/7=(L+T2D[1]+T2D[2]+T2B[1]+T2B[2]+T2B[3]+T2B[4])/7$$

it follows that the value of test interpolation data TD2[T2] is:

$$TD2[T2] =$$
$$(T2B[1] + T2B[2] + T2B[3] + T2B[4]) - (T2C[1] + T2C[2] + T2C[3])$$

From T2C[1]=a=74, T2C[2]=b=57, T2C[3]=c=100, T2B[1]=c=100, T2B[2]=d=143, T2B[3]=e=126, and T2B[4]=a=74, it follows that:

$$TD2[T2]=(100+143+126+74)-(74+57+100)=212$$

The marking circuit 17 outputs the absolute value of the difference between the value WH1[T2] of the image data WH1 at the location of test pixel T2 and the value of test interpolation data TD2[T2] as marking data M2[T2]. From TD2[T2]=212 and WH1[T2]=d=143, it follows that the value of marking data M2[T2] is:

$$M2[T2]=|TD2[T2]-WH1[T2]|=|212-143|=69$$

Figure 18A:
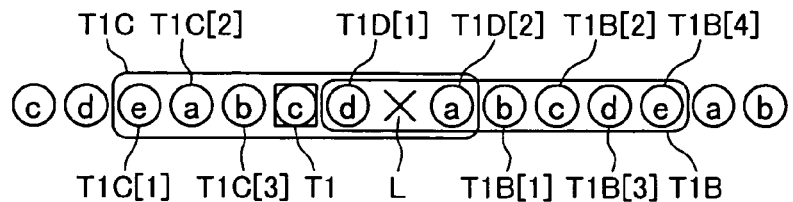
FIGS. 18(a) to 18(e) show missing pixels and the neighboring test pixels in a series of pixels processed in the interpolator unit of the image scanner according to the first embodiment.
Figure 18B:
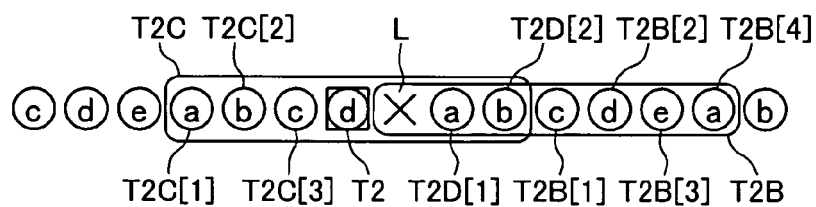
Figure 18C:
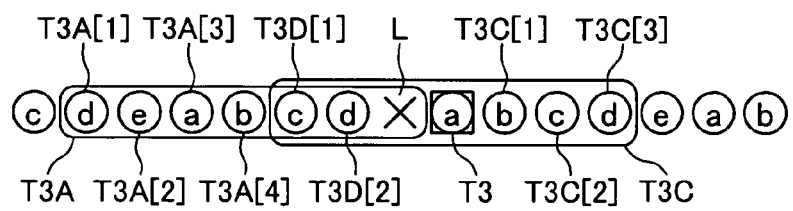

As shown in FIG. 18(c), the second mean preserving interpolation calculation circuit 14(2) obtains test interpolation data TD2[T3] for test pixel T3 such that the mean value of the pixel sequence T3C including the test pixel T3 is equal to the mean value of the pixel sequence T3A not including the test pixel T3. From the equation $$(T3A[1]+T3A[2]+T3A[3]+T3A[4]+T3D[1]+T3D[2]+L)/7=(T3D[1]+T3D[2]+L+TD2[T3]+T3C[1]+T3C[2]+T3C[3])/7$$

it follows that the value of test interpolation data TD2[T3] is:

$$TD2[T3] =$$
$$(T3A[1] + T3A[2] + T3A[3] + T3[4]) - (T3C[1] + T3C[2] + T3C[3])$$

From T3C[1]=b=57, T3C[2]=c=100, T3C[3]=d=143, T3A[1]=d=143, T3A[2]=e=126, T3A[3]=a=74, and T3A[41]=b=57, it follows that:

$$TD2[T3]=(143+126+74+57)-(57+100+143)=100$$

The marking circuit 17 outputs the absolute value of the difference between the value WH1[T3] of the image data WH1 at the location of test pixel T3 and the value of test interpolation data TD2[T3] as marking data M2[T3]. From TD2[T3]=100, WH1[T3]=a=74, it follows that the value of marking data M2[T3] is:

$$M2[T3]=|TD2[T3]-WH1[T3]|=|100-74|=26$$

Figure 18D:
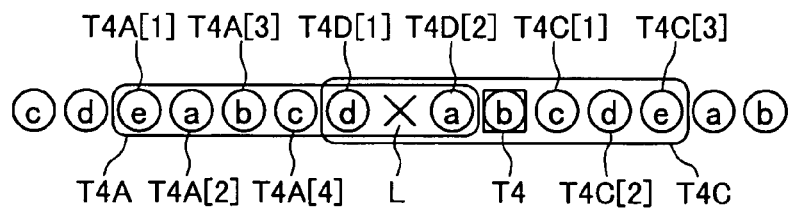

As shown in FIG. 18(d), the second mean preserving interpolation calculation circuit 14(2) obtains test interpolation data TD2[T4] for test pixel T4 such that the mean value of the pixel sequence T4C including the test pixel T4 is equal to the mean value of the pixel sequence T4A not including the test pixel T4. From the equation $$(T4A[1]+T4A[2]+T4A[3]+T4A[4]+T4D[1]+L+T4D[2])/7=(T4D[1]+L+T4D[2]+TD2[T4]+T4C[1]+T4C[2]+T4C[3])/7$$

it follows that the value of test interpolation data TD2[T4] is:

$$TD2[T4] =$$
$$(T4A[1] + T4A[2] + T4A[3] + T4A[4]) - (T4C[1] + T4C[2] + T4C[3])$$

From T4C[1]=c=100, T4C[2]=d=143, T4C[3]=e=126, T4A[1]=e=126, T4A[2]=a=74, T4A[3]=b=57, and T4A[4]=c=100, it follows that:

$$TD2[T4]=(126+74+57+100)-(100+143+126)=-12$$

The marking circuit 17 outputs the absolute value of the difference between the value WH1[T4] of the image data WH1 at the location of test pixel T4 and the value of test interpolation data TD2[T4] as marking data M2[T4]. From TD2[T4]=-12, WH1[T4]=b=57, it follows that the value of marking data M2[T4] is:

$$M2[T4]=|TD2[T4]-WH1[T4]|=|-12-57|=69$$

Figure 18E:
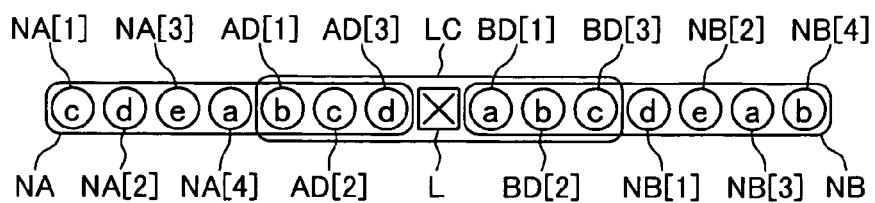

As shown in FIG. 18(e), the second mean preserving interpolation calculation circuit 14(2) obtains interpolation data for the missing pixel L such that the mean value of the pixel sequence LC including the missing pixel L is equal to the mean value of the pixel sequences NA and NB not including the missing pixel L. From the equation $$(AD[1]+AD[2]+AD[3]+DI1+BD[1]+BD[2]+BD[3])/7=((NA[1]+NA[2]+NA[3]+NA[4]+AD[1]+AD[2]+AD[3])/7+(BD[1]+BD[2]+BD[3]+NB[1]+NB[2]+NB[3]+NB[4])/7)/2$$

it follows that the value of the interpolation data DI1 is:

$$DI1 = ((NA[1] + NA[2] + NA[3] + NA[4] + AD[1] + AD[2] + AD[3]) +$$
$$(BD[1] + BD[2] + BD[3] + NB[1] + NB[2] + NB[3] + NB[4]))/2 -$$
$$(AD[1] + AD[2] + AD[3] + BD[1] + BD[2] + BD[3])$$

From NA[1]=c=100, NA[2]=d=143, NA[3]=e=126, NA[4]=a=74, AD[1]=b=57, AD[2]=c=100, AD[3]=d=143, BD[1]=a=74, BD[2]=b=57, BD[3]=c=100, NB[1]=c=143, NB[2]=e=126, NB[3]=a=74, and NB[4]=b=57, it follows that:

$$DI1 = ((100 + 143 + 126 + 74 + 57 + 100 + 143) +$$
$$(74 + 57 + 100 + 143 + 126 + 74 + 57))/2 -$$
$$(57 + 100 + 143 + 74 + 57 + 100)$$
$$= 156$$

FIG. 19 is a table showing the marking data M0 to M2 for test pixels T1 to T4.

The operation of the management circuit 16 will now be described.

The management circuit 16 generates the sum of the values of marking data M0[T1] to M0[T4] for the left-right mean interpolation calculation circuit 14(0) as score data S0. From M0[T1]=0, M0[T2]=56, M0[T3]=26, and M0[T4]=30, it follows that the value of score data S0 is:

$$S0 = M0[T1] + M0[T2] + M0[T3] + M0[T4]$$
$$= 0 + 56 + 26 + 30$$
$$= 112$$

Similarly, the management circuit 16 generates the sum of the values of marking data M1[T1] to M1[T4] as score data S1 for the first mean preserving interpolation calculation circuit 14(1). From M1[T1]=0, M1[T2]=0, M1[T3]=0, and M1[T4]=0, it follows that the value of score data S1 is:

$$S1 = M1[T1] + M1[T2] + M1[T3] + M1[T4]$$
$$= 0 + 0 + 0 + 0$$
$$= 0$$

In the same way, the management circuit 16 generates the sum of the values of marking data M2[T1] to M2[T4] as score data S2 for the second mean preserving interpolation calculation circuit 14(2). From M2[T1]=69, M2[T2]=69, M2[T3]=26, and M2[T4]=69, it follows that the value of score data S2 is:

$$S2 = M2[T1] + M2[T2] + M2[T3] + M2[T4]$$
$$= 69 + 69 + 26 + 69$$
$$= 233$$

FIG. 20 is a table showing score data S0 to S2 for the left-right mean interpolation calculation circuit 14(0), the first mean preserving interpolation calculation circuit 14(1), and the second mean preserving interpolation calculation circuit 14(2).

If the score data of an interpolation calculation circuit have a small value, then the interpolation calculation circuit can interpolate pixels properly in the neighborhood of the missing pixel, and by inference, it can also correctly carry out interpolation for the missing pixel. The management circuit 16 outputs a selection signal C so as to select the interpolation data output by the first mean preserving interpolation calculation circuit 14(1) having the score data with the smallest value (S1=0) among score data S0 to S2.

Operating according to the selection signal C output by the management circuit 16, the output circuit 13 outputs the value of interpolation data DI1 (DI1=126) as IP1. As shown in FIG. 14(*b*), the image data value WH1 of the missing pixel L is 126; missing pixel interpolation is thus carried out with minimum error.

The interpolator unit 4 with the configuration in FIG. 13 is able to carry out missing pixel interpolation properly because it generates test interpolation data for the three interpolation calculation circuits with respect to test pixels T1 to T4 in the neighborhood of the missing pixel L, then marks and evaluates the test interpolation data to select the one of the three interpolation calculation circuits most suitable for the image content.

An example using the configuration in FIG. 13 with different image data will now be shown.

FIGS. 21(*a*) and 21(*b*) show exemplary periodic image data. FIG. 21(*a*) illustrates image data with a pixel period of seven (Pp=7) that repeat the intensity values 80, 56, 65, 100, 135, 144, and 120 (a=80, b=56, c=65, d=100, e=135, f=144, g=120). FIG. 21(*b*) illustrates the positional relationship between the missing pixel and the test pixels. Test pixels T1 to T4 corresponding to the missing pixel L are positioned one dimensionally, two pixels each on the left and right of the missing pixel L.

Test interpolation is carried out by the left-right mean interpolation calculation circuit 14(0), the first mean preserving interpolation calculation circuit 14(1), and the second mean preserving interpolation calculation circuit 14(2) with respect to the test pixels T1 to T4 in FIG. 21(*b*) in the same way as illustrated in FIGS. 16(*a*) to 16(*e*), 17(*a*) to 17(*e*), and 18(*a*) to 18(*e*), so a description will be omitted.

FIG. 22 is a table showing the marking data M0 to M2 for test pixels T1 to T4.

The operation of the management circuit 16 will now be described.

The management circuit 16 generates the sum of the values of marking data M0[T1] to M0[T4] for the left-right mean interpolation calculation circuit 14(0) as score data S0. From M0[T1]=13, M0[T2]=4.5, M0[T3]=71, and M0[T4]=8, it follows that the value of score data S0 is:

$$S0 = M0[T1] + M0[T2] + M0[T3] + M0[T4]$$
$$= 13 + 4.5 + 71 + 8$$
$$= 96.5$$

Similarly, the management circuit 16 generates the sum of the values of marking data M1[T1] to M1[T4] as score data S1 for the first mean preserving interpolation calculation circuit 14(1). From M1[T1]=143, M1[T2]=35, M1[T3]=143, and M1[T4]=35, it follows that the value of score data S1 is:

$$S1 = M1[T1] + M1[T2] + M1[T3] + M1[T4]$$
$$= 143 + 35 + 143 + 35 = 356$$

In the same way, the management circuit 16 generates the sum of the values of marking data M2[T1] to M2[T4] as score data S2 for the second mean preserving interpolation calculation circuit 14(2). From M2[T1]=0, M2[T2]=0, M2[T3]=0, and M2[T4]=0, it follows that the value of score data S2 is:

$$S2 = M2[T1] + M2[T2] + M2[T3] + M2[T4]$$
$$= 0 + 0 + 0 + 0 = 0$$

FIG. 23 is a table showing score data S0 to S2 for the left-right mean interpolation calculation circuit 14(0), the first mean preserving interpolation calculation circuit 14(1), and the second mean preserving interpolation calculation circuit 14(2).

If the score data of an interpolation calculation circuit have a small value, then the interpolation calculation circuit can interpolate pixels properly in the neighborhood of the missing pixel, and by inference, it can also correctly carry out interpolation for the missing pixel. The management circuit 16 outputs a selection signal C so as to select the interpolation data output by the second mean preserving interpolation calculation circuit 14(2) having the score data with the smallest value (S2=0) among score data S0 to S2.

The output circuit 13 outputs the value of interpolation data DI2 (DI2=135) as IP1 according to the selection signal C output by the management circuit 16. As shown in FIG. 21(*a*), the data value WH1 of the missing pixel L is 135; missing pixel interpolation is thus carried out with minimum error.

The interpolator unit 4 with the configuration in FIG. 13 generates test interpolation data for the three interpolation calculation circuits with respect to test pixels T1 to T4 in the neighborhood of the missing pixel L, then marks and evaluates the test interpolation data to select the one of the three interpolation calculation circuits most suitable for the image content, and is accordingly able to carry out missing pixel interpolation correctly for the data in FIG. 21(*a*).

Another example using the configuration in FIG. 13 with different image data will now be described.

FIGS. 24(*a*) and 24(*b*) show exemplary periodic image data. FIG. 24(*a*) illustrates image data with a pixel period of seventeen (Pp=17) that repeat the intensity values 100, 116, 130, 140, 145, 143, 136, 124, 108, 92, 76, 64, 57, 55, 60, 70, and 84 (a=100, b=116, c=130, d=140, e=145, f=143, g=136, h=124, i=108, j=92, k=76, l=64, m=57, n=55, o=60, p=70, q=84). FIG. 24(*b*) illustrates the positional relationship between the missing pixel and the test pixels. Test pixels T1 to T4 corresponding to the missing pixel L are positioned one dimensionally, two pixels each on the left and right of the missing pixel L.

Test interpolation is carried out by the left-right mean interpolation calculation circuit 14(0), the first mean preserving interpolation calculation circuit 14(1), and the second mean preserving interpolation calculation circuit 14(2) with respect to the test pixels T1 to T4 in FIG. 24(*b*) in the same way as illustrated in FIGS. 16(*a*) to 16(*e*), 17(*a*) to 17(*e*), and 18(*a*) to 18(*e*), so a description will be omitted.

Figures 25, 26, 27:
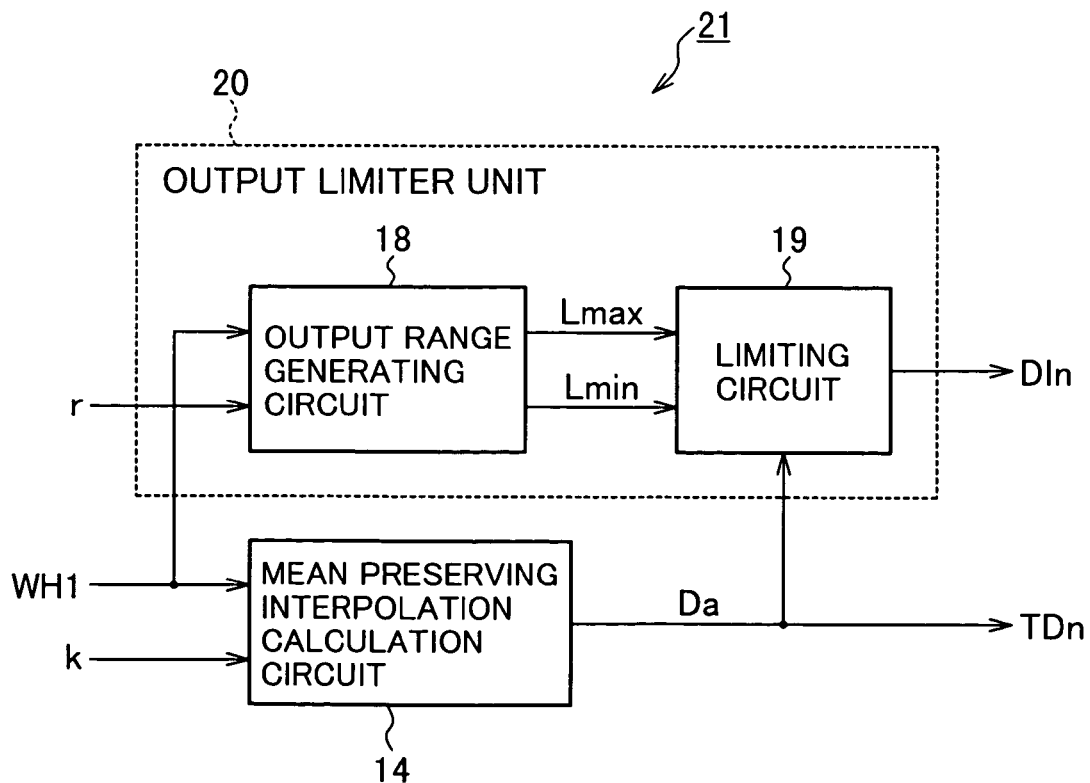
FIG. 25 is a table showing evaluation results of each interpolation calculation circuit when a plurality of test pixels are interpolated in the interpolator unit of the image scanner according to the first embodiment.
FIG. 26 is a table showing the total evaluation result of each interpolation calculation circuit in the interpolator unit of the image scanner according to the first embodiment.
FIG. 27 is a block diagram showing details of the mean preserving interpolation circuit in the interpolator unit of an image scanner according to a second embodiment.

FIG. 25 is a table showing the marking data M0 to M2 for test pixels T1 to T4.

The operation of the management circuit 16 will now be described.

The management circuit 16 generates the sum of the values of marking data M0[T1] to M0[T4] for the left-right mean interpolation calculation circuit 14(0) as score data S0. From M0[T1]=3.5, M0[T2]=8.5, M0[T3]=1.5, and M0[T4]=0, it follows that the value of score data S0 is:

$$S0 = M0[T1] + M0[T2] + M0[T3] + M0[T4]$$
$$= 3.5 + 8.5 + 1.5 + 0 = 13.5$$

Similarly, the management circuit 16 generates the sum of the values of marking data M1[T1] to M1[T4] as score data S1 for the first mean preserving interpolation calculation circuit 14(1). From M1[T1]=91, M1[T2]=152, M1[T3]=91, and M2[T4]=152, it follows that the value of score data S1 is:

$$S1 = M1[T1] + M1[T2] + M1[T3] + M1[T4]$$
$$= 91 + 152 + 91 + 152 = 486$$

In the same way, the management circuit 16 generates the sum of the values of marking data M2[T1] to M2[T4] as score data S2 for the second mean preserving interpolation calculation circuit 14(2). From M2[T1]=191, M2[T2]=269, M2[T3]=86, and M2[T4]=191, it follows that the value of score data S2 is:

$$S2 = M2[T1] + M2[T2] + M2[T3] + M2[T4]$$
$$= 191 + 269 + 86 + 191 = 737$$

FIG. 26 is a table showing score data S0 to S2 for the left-right mean interpolation calculation circuit 14(0), the first mean preserving interpolation calculation circuit 14(1), and the second mean preserving interpolation calculation circuit 14(2).

If the score data of an interpolation calculation circuit have a small value, then the interpolation calculation circuit can interpolate pixels properly in the neighborhood of the missing pixel, and by inference, it can also correctly carry out interpolation for the missing pixel. The management circuit 16 outputs a selection signal C so as to select the interpolation data output by the left-right mean interpolation calculation circuit 14(0) having the score data with the smallest value (S0=13.5) among score data S0 to S2.

The output circuit 13 outputs the value of interpolation data DI0 (DI0=133.5) according to the selection signal C output by the management circuit 16. The data value WH1 of the missing pixel L shown in FIG. 24(*a*) is 136; missing pixel interpolation is thus carried out with minimum error.

The interpolator unit 4 with the exemplary configuration in FIG. 13 has the three interpolation calculation circuits generate test interpolation data for test pixels T1 to T4 in the neighborhood of the missing pixel L, then marks and evaluates the test interpolation data to select the one of the three interpolation calculation circuits most suitable for the image content, and is accordingly able to carry out missing pixel interpolation correctly for the data in FIG. 24(*a*).

The selection signal generating unit 15 including the management circuit 16 and marking circuit 17 evaluates the result of interpolation performed by the interpolation calculation circuits for the pixels in the neighborhood of the missing pixel not including the missing pixel, and selects and outputs the most suitable interpolation result given by the interpolation calculation circuits for the missing pixel. Because the selection signal selects the interpolation data produced by the interpolation calculation circuit most suitable for the image content, the interpolator unit 4 including the selection signal generating unit 15 can carry out missing pixel interpolation correctly.

Instead of performing missing pixel interpolation in all the interpolation calculation circuits, the results of interpolation performed by the interpolation calculation circuits on non-missing test pixels in the neighborhood of the missing pixel may be evaluated, and missing pixel interpolation may be carried out only by the interpolation calculation circuit that produces the best interpolation result. The interpolation calculation evaluation and selection processes could also be described as evaluating the results of non-missing test pixel interpolation in the neighborhood of the missing pixel by using different numbers of pixels, and performing missing pixel interpolation by using the number of pixels that gives the best test result.

As described earlier, missing pixel interpolation is carried out after variations in the characteristics of the imaging devices have been corrected for, so a high-quality scanned image can be obtained even if the imaging devices have varying characteristics.

In missing pixel interpolation, interpolation data for missing pixels are obtained such that the mean value of a plurality of pixels including the missing pixel and the mean value of a plurality of pixels not including the missing pixel are equal, so a high-quality scanned image can be obtained even when a highly periodic image is scanned.

In the operation described above, the light source 7 is monochromatic (white, or another single color), but the light source 7 may have a plurality of colors (red, green, and blue, for example) and be switchable to an arbitrary one of the colors. With such a light source 7, color image data can be obtained by scanning one image line a number of times, successively changing the color of the light source 7.

Second Embodiment

FIG. 27 is a block diagram showing details of the mean preserving interpolation circuit of an image scanner according to a second embodiment. The second embodiment differs from the first embodiment in that each of the mean preserving interpolation calculation circuits 14(1) to **14(*n*) is replaced by the mean preserving interpolation circuit 21 shown in FIG. 27**.

As illustrated, an output limiter unit 20 is added to limit the output of the mean preserving interpolation calculation circuit 14. The output limiter unit 20 includes an output range generating circuit 18 and a limiting circuit 19 and reduces the interpolation error occurring in the mean preserving interpolation calculation circuit 14 because of noise or the like.

The mean preserving interpolation circuit 21 in the second embodiment includes the mean preserving interpolation calculation circuit 14 and the output limiter unit 20. In the first embodiment, each of the mean preserving interpolation calculation circuits 14(1) to (14(n)) alone constitutes a mean preserving interpolation circuit.

Figure 28:
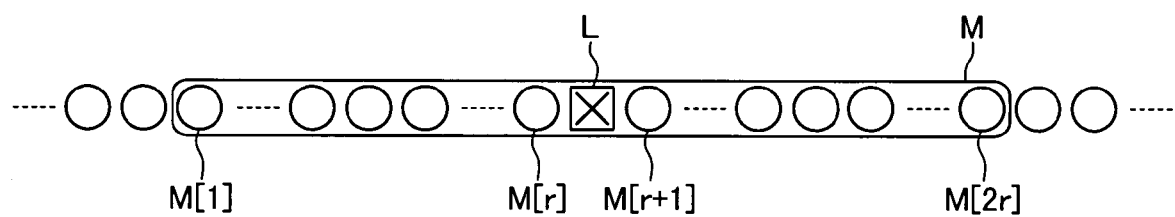
FIG. 28 shows a pixel sequence processed in the interpolator unit of the image scanner according to the second embodiment.

FIG. 28 shows a portion of the image data WH1 and the positional relationship between the missing pixel and the range of reference data.

The image data WH1 are input to the output range generating circuit 18 and the mean preserving interpolation calculation circuit 14. A parameter k is input to the mean preserving interpolation calculation circuit 14. The mean preserving interpolation calculation circuit 14 outputs pre-limitation data Da based on the image data WH1 and the parameter k. The pre-limitation data Da are input to the limiting circuit 19 and, in test interpolation, are input to the marking circuit 17 as the test interpolation data TDn. The test interpolation data TDn are the same as in the first embodiment.

Externally provided data that specify the reference data range r are input to the output range generating circuit 18. The output range generating circuit 18 generates a maximum output value Lmax and a minimum output value Lmin based on r pixels on the right and r pixels on the left of a missing pixel in the image data WH1. The maximum output value Lmax can be expressed as follows:

$$Lmax = max(M[1], \ldots, M[r], M[r+1], \ldots, M[2r])$$

where max (M[1], ..., M[r], M[r+1], ..., M[2r]) is a function for obtaining the maximum value of pixels M[1], M[r+1], ..., M[2r]. The maximum output value Lmax is input to the limiting circuit 19.

The minimum output value Lmin can be expressed as follows:

$$Lmin = min(M[1], \ldots, M[r], M[r+1], \ldots, M[2r])$$

where min(M[1], ..., M[r], M[r+1], ..., M[2r]) is a function that obtains the minimum value of pixels M[1], M[r+1]M[2r]. The minimum output value Lmin is input to the limiting circuit 19.

The limiting circuit 19 limits the value of the pre-limitation data Da based on the maximum output value Lmax and the minimum output value Lmin, and outputs the result as post-limitation data DIn. The post-limitation data DIn can be represented as follows:

If Da<Lmin then DIn=Lmin,

If Lmin≦Da≦Lmax then DIn=Da,

If Lmax<DIn then DIn=Lmax

In the second embodiment, as described above, the outputs of the mean preserving interpolation calculation circuits 14(1) to 14(n) can be limited to the range of the intensity values of the 2r pixels in the neighborhood of the missing pixel. That is, the values that the output signal can take can be limited by the minimum and maximum values of the pixels in a neighborhood of the missing pixel.

A specific example will be described below.

Figure 29:
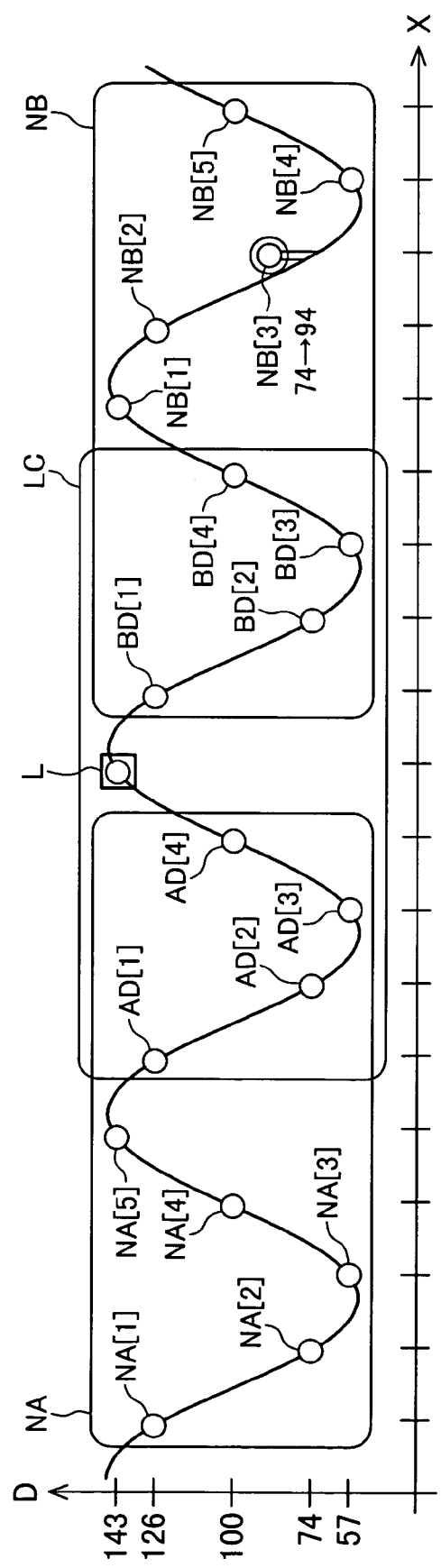
FIG. 29 is a waveform diagram showing exemplary pixel data processed in the interpolator unit of the image scanner according to the second embodiment.

FIG. 29 shows an exemplary structure of the interpolation calculation circuit.

FIG. 29 shows image data with a pixel period of five (Pp=5). In FIG. 29, the value of pixel NB[3] is changed from 74 to 94 due to noise.

The image data WH1 are input to the mean preserving interpolation calculation circuit 14 and the output range generating circuit 18. A parameter k equal to nine (k=9) is input to the mean preserving interpolation calculation circuit 14. The mean preserving interpolation calculation circuit 14 obtains interpolation data for the missing pixel L such that the mean value of the pixel sequence LC including the missing pixel is equal to the mean value of the two pixel sequences NA and NB not including the missing pixel. The equation is:

$$(AD[1] + AD[2] + AD[3] + AD[4] + L + BD[1] + BD[2] +$$
$$BD[3] + BD[4])/9 = ((NA[1] + NA[2] +$$
$$NA[3] + NA[4] + NA[5] + AD[1] + AD[2] +$$
$$AD[3] + AD[4])/9 + (BD[1] + BD[2] +$$
$$BD[3] + BD[4] + NB[1] + NB[2] + NB[3] +$$
$$NB[4] + NB[5])/9)/2$$

Therefore, the value of the missing pixel L is:

$$L = ((NA[1] + NA[2] + NA[3] + NA[4] + NA[5] + AD[1] +$$
$$AD[2] + AD[3] + AD[4]) + (BD[1] + BD[2] + BD[3] +$$
$$BD[4] + NB[1] + NB[2] + NB[3] + NB[4] +$$
$$NB[5]))/2 - (AD[1] + AD[2] + AD[3] + AD[4] +$$
$$L + BD[1] + BD[2] + BD[3] + BD[4])$$

From NA[1]=126, NA[2]=74, NA[3]=57, NA[4]=100, NA[5]=143, AD[1]=126, AD[2]=74, AD[3]=57, AD[4]=100, BD[1]=126, BD[2]=74, BD[3]=57, BD[4]=100, NB[1]=143, NB[2]=126, NB[3]=94, NB[4]57, and NB[5]=100, it follows that:

$$L = \begin{array}{l}((126 + 74 + 57 + 100 + 143 + 126 + 74 + 57 + 100) + \\ (126 + 74 + 57 + 100 + 143 + 126 + 94 + 57 + 100))/2 - \\ (126 + 74 + 57 + 100 + 126 + 74 + 57 + 100)\end{array}$$
$$= 153$$

The value of the interpolation data for the missing pixel L is taken as the value of pre-limitation data Da. The pre-limitation data Da are input to the limiting circuit 19.

A reference data range r equal to nine (r=9) is input to the output range generating circuit 18. The output range generating circuit 18 outputs the maximum value of the nine pixels on the right and nine pixels on the left of the missing pixel L in the image data WH1 as the maximum output value Lmax. The maximum output value Lmax is:

Lmax=143

The maximum output value Lmax is input to the limiting circuit 19.

The output range generating circuit 18 outputs the minimum value of the nine pixels on the right and nine pixels on the left of the missing pixel L in the image data WH1 as the minimum output value Lmin. The minimum output value Lmin is:

Lmin=57

The minimum output value Lmin is input to the limiting circuit 19.

The limiting circuit 19 corrects and limits the value of the pre-limitation data Da based on the maximum output value Lmax and the minimum output value Lmin, and outputs the result as post-limitation data DIn. From Da=153, Lmax=143, and Lmin=57, it follows that:

Lmax<Da

Therefore, the value of post-limitation data DIn is:

DIn=Lmax=143

As shown in FIG. 29, the data value WH1 of the missing pixel L is 143, so the post-limitation data DIn are free of error (|143−143|=0), whereas the pre-limitation data Da are in error by |153−143 |=10. Limiting the output range of the mean preserving interpolation calculation circuit thus reduces the interpolation error.

Third Embodiment

Although the image interpolation apparatus is structured to carry out missing-pixel interpolation by hardware in the first embodiment, it is also possible to carry out missing-pixel interpolation by software, or by a combination of software and hardware.

Figure 30:
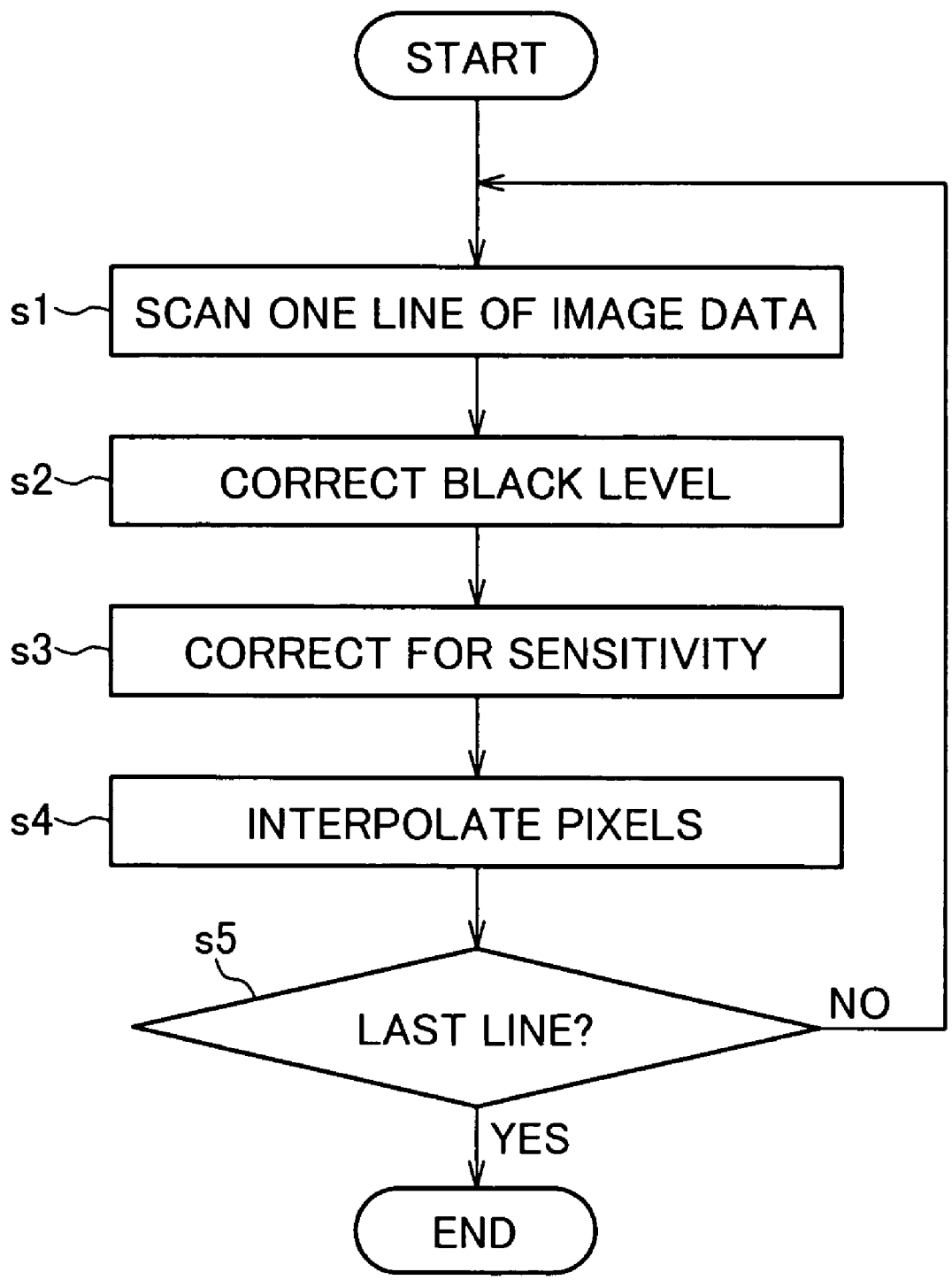
FIG. 30 is a flowchart illustrating the operation of a signal processing procedure according to a third embodiment.

FIG. 30 is a flowchart illustrating the signal processing operations in the image scanner as performed by software.

The operations will now be described.

In step s1, one line of image data is scanned. This is equivalent to the operations up to the conversion of the image signal A1 output from the imager unit 1 to digital image data in the A/D converter unit 2 in the first embodiment.

The black level of the line of image data obtained in step s1 is corrected in step s2. This step corresponds to the operation of the black compensation circuit 9 in the first embodiment.

Step s3 corrects for sensitivity variations in the black-level-corrected image data obtained in step s2. This step corresponds to the operation of the sensitivity compensation circuit 10 in the first embodiment.

Following the correction for sensitivity variations in step s3, missing image data are interpolated in step s4. This step corresponds to the operation of the interpolator unit 4 in the first embodiment.

Step s5 checks whether the image data interpolated in step s4 are in the last line. If not, the process returns to step s1, and steps s1 to s4 are repeated. If the interpolated image data are in the last line, the process ends.

Figure 31:
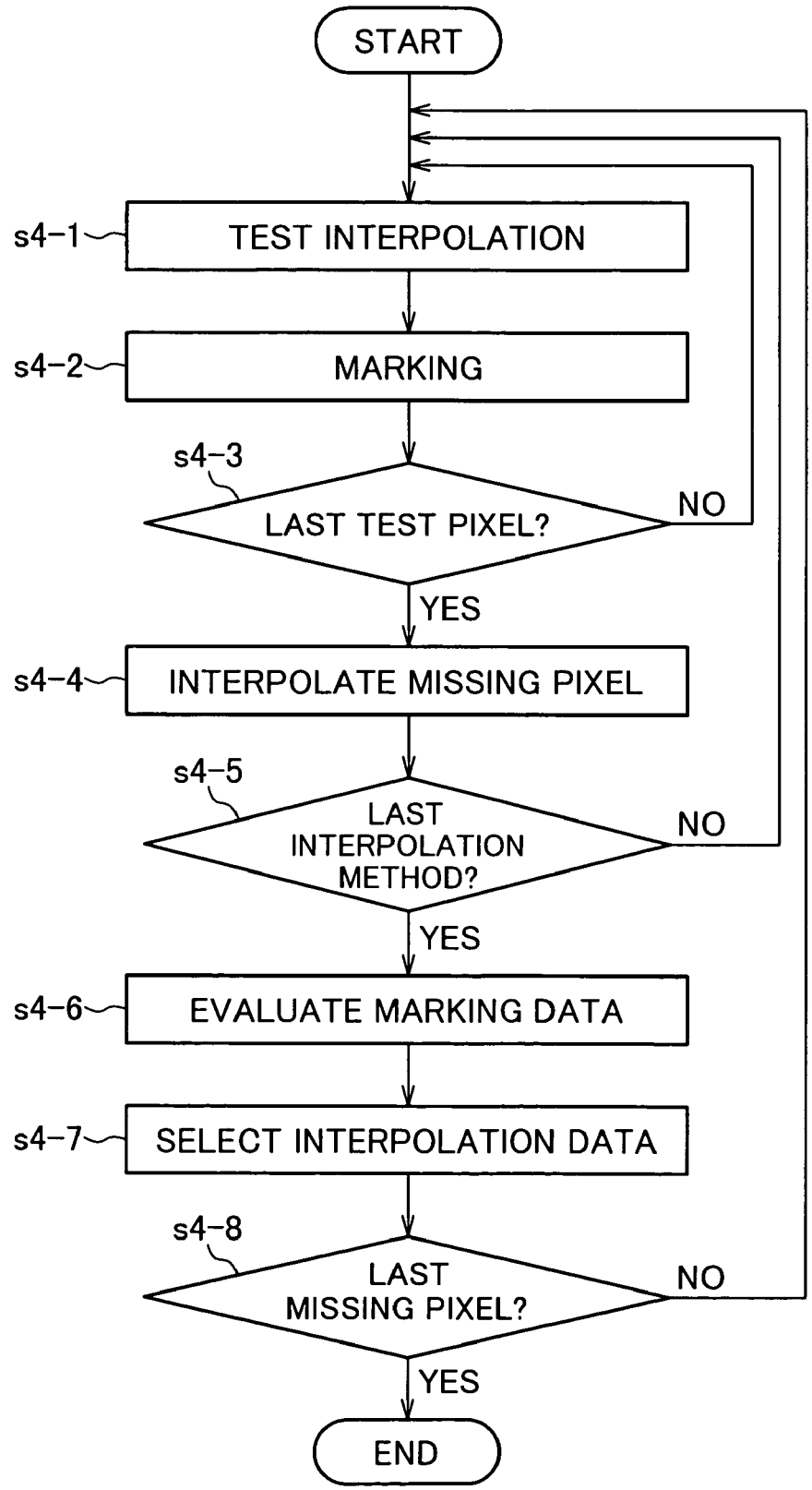
FIG. 31 is a flowchart illustrating interpolation according to the third embodiment.

FIG. 31 is a flowchart illustrating missing-pixel interpolation using software (a pixel interpolation method).

In step s4-1, test interpolation data for test pixel T1 (corresponding to TD0[T1] in the first embodiment) are generated using the adjacent pixel mean interpolation calculation process.

In step s4-2, marking data (corresponding to M0[T1] in the first embodiment) are generated by taking the absolute value of the difference between the value of the image data WH1 at the location of test pixel T1 (corresponding to WH1[T1] in the first embodiment) and the value of the test interpolation data generated in step s4-1.

Next, step s4-1 is repeated to generate test interpolation data for test pixel T2 (corresponding to TD0[T2] in the first embodiment) using the adjacent pixel mean interpolation calculation process.

In step s4-2, marking data (corresponding to M0[T2] in the first embodiment) are generated by taking the absolute value of the difference between the value of the image data WH1 at the location of test pixel T2 (corresponding to WH1[T2] in the first embodiment) and the value of the test interpolation data generated in step s4-1.

Similarly, the procedure in steps s4-1 and s4-2 is repeated for test pixels T3 to Tm (step s4-3). Marking data for all test pixels T1 to Tm are thus obtained using the adjacent pixel mean interpolation calculation process.

In step s4-4, interpolation data for the missing pixel L are generated using the adjacent pixel mean interpolation calculation process.

Next, step s4-1 is repeated to generate test interpolation data for test pixel T1 (corresponding to TD1[T1] in the first embodiment) using the first mean preserving interpolation calculation process.

In step s4-2, marking data (corresponding to M1[T1] in the first embodiment) are generated by taking the absolute value of the difference between the value of the image data WH1 at the location of test pixel T1 (corresponding to WH1[T1] in the first embodiment) and the value of the test interpolation data generated in step s4-1.

Next, step s4-1 is repeated to generate test interpolation data for test pixel T2 (corresponding to TD1[T2] in the first embodiment) using the first mean preserving interpolation calculation process.

In step s4-2, marking data (corresponding to M1[T2] in the first embodiment) are generated by taking the absolute value of the difference between the value of the image data WH1 at the location of test pixel T2 (corresponding to WH1[T2] in the first embodiment) and the value of the test interpolation data generated in step s4-1.

Similarly, the procedure in steps s4-1 and s4-2 is repeated for test pixels T3 to Tm (step s4-3). Marking data for all test pixels T1 to Tm are thus obtained using the first mean preserving interpolation calculation process.

In step s4-4, interpolation data for the missing pixel L are generated using the first mean preserving interpolation calculation process.

The procedure in steps s4-1 to s4-4 is repeated in the same way using the second mean preserving interpolation calculation process to the nth mean preserving interpolation calculation process (step s4-5). Marking data for all test pixels T1 to Tm and the interpolation data for the missing pixel L are obtained using the adjacent pixel mean interpolation calculation process and each of the first to nth mean preserving interpolation calculation methods.

In step s4-6, scoring data for the adjacent pixel mean interpolation calculation process and each of the first to nth mean preserving interpolation calculation processes (corresponding to S0 to Sn in the first embodiment) are generated by adding up the marking data for each interpolation calculation method.

In step s4-7, the interpolation data for interpolating the missing pixel are selected based on the scoring data generated in step s4-6.

The procedure in the above steps s4-1 to s4-7 is repeated until all missing pixels have been processed (step s4-8).

The processes in each step have been described in detail in the first embodiment, so a description will be omitted here.

As described above, missing pixel interpolation is performed after correction for variations in characteristics of the imaging devices, so a high-quality scanned image can be obtained even if the imaging devices have varying characteristics.

In missing pixel interpolation, interpolation data for a missing pixel are obtained in such a way that the mean value of a plurality of pixels including the missing pixel and the mean value of a plurality of pixels not including the missing pixel are equal, so a high-quality scanned image can be obtained even when a highly periodic image is scanned.

Fourth Embodiment

Figure 32:
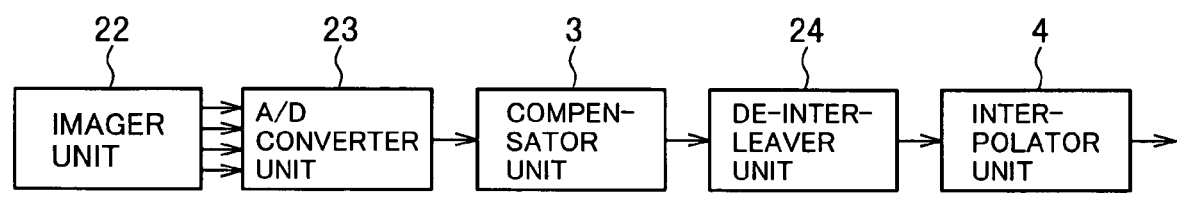
FIG. 32 is a block diagram showing the structure of an image scanner according to a fourth embodiment.

The imager unit 1 in the first embodiment was described as outputting the image signal A1 of one line as a serial signal, but the image signal of one line may be divided into a plurality of parts for parallel output as shown in FIG. 32. As the A/D converter unit and the units following it generally operate faster than the imager unit, the time needed to process one line can be reduced by adopting the configuration shown in FIG. 32.

In FIG. 32, reference numeral 22 denotes an imager unit, reference numeral 23 denotes an A/D converter unit, and a reference numeral 24 denotes a de-interleaver unit.

Figure 33:
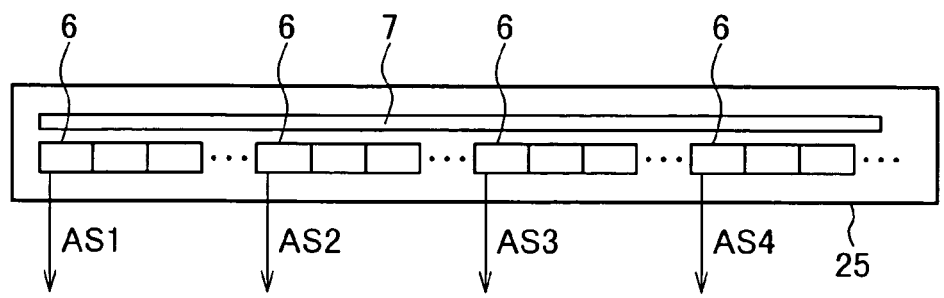
FIG. 33 schematically illustrates the imager unit in FIG. 32.

FIG. 33 is a schematic diagram showing the structure of the imager unit 22. In FIG. 33, one line is divided into four parts, and the contact image sensor 25 outputs four image signals AS1, AS2, AS3, and AS4 in parallel. Image signals AS1, AS2, AS3, and AS4 correspond to the pixel sequences in the four parts of the single line.

Figure 34:
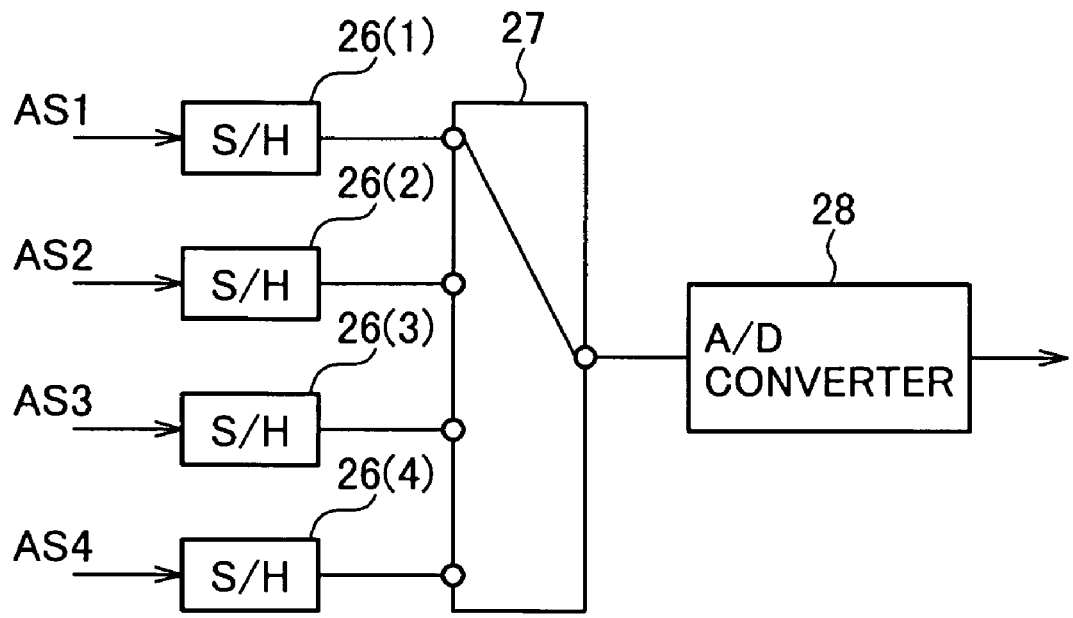
FIG. 34 is a block diagram showing details of the analog-to-digital converter unit in FIG. 32.

FIG. 34 is a block diagram showing the structure of the A/D converter unit 23 in the fourth embodiment. The illustrated A/D converter unit 23 includes sample-hold circuits 26(1) to 26(4), a switch 27 for selecting one of the plurality of image signals, and an A/D converter 28.

The image signals AS1 to AS4 of the four separate parts of one line output from the contact image sensor 25 are input to the sample-hold circuits 26(1) to 26(4), which sample and hold the image signals at given timings.

The switch 27 selects the sample-hold circuits 26(1) to 26(4) sequentially and outputs the signals they hold to the A/D converter 28. The image signals AS1 to AS4 output from the switch 27 are converted sequentially to digital data by the A/D converter 28. The switch 27 selects and outputs the four image signals AS1 to AS4 output by the contact image sensor 25 within the period of one pixel, and the A/D converter 28 converts the four signals output by the switch 27 to digital data. The sampling rate of the A/D converter 28 is at least four times the image signal output rate of the contact image sensor 25.

The image data output by the A/D converter 28 are input to the compensator unit 3 for black level and sensitivity correction, as in the first embodiment. The image data corrected by the compensator unit 3 are input to the de-interleaver 24 and de-interleaved.

The image data are input to the de-interleaver 24 in the order in which the image signals are output by the contact image sensor 25, with data for pixel positions in the four separate parts following one another consecutively, so the data are not continuous in the main scanning direction. This is inconvenient for interpolation calculations, so the image data are rearranged to make the data continuous in the main scanning direction. The de-interleaver 24 takes the image data which are discontinuous in the main scanning direction, rearranges the data by using a temporary storage device such as a static random-access memory (SRAM), and outputs rearranged continuous data to the interpolator unit 4.

The image data input to the interpolator unit 4 and the operation of the interpolator unit 4 are the same as in the first embodiment.

With the configuration described above, the time needed to process one line can be reduced.

In the description of the operation of the fourth embodiment, the de-interleaver 24 is disposed after the compensator unit 3, but the same result is obtained if the compensator unit 3 follows the de-interleaver 24.

The single line of the imager unit 22 does not have to be divided into four parts. Any number of parts that reduces the time for processing a single line can be selected, with the number of imaging devices in the imager unit 22, the operating speed of the imager unit 22, and the operating speed of the A/D converter unit 23 and its following units taken into consideration.

For instance, if the imager unit 22 operates at a maximum clock frequency of Fa (MHz) and the A/D converter unit 23 and its following units operate at a maximum frequency of Fb (MHz), the maximum number of parts n can be obtained as follows:

$n=Int(Fb/Fa)$ where Int(x) is a function that returns the integer part of x. The number of parts can be selected in the range from 2 to n to reduce the time needed to process one line.

Fifth Embodiment

In the first embodiment, the sensor chips used in the contact image sensor scan a monochrome image (black and white, for example), or a plurality of light sources are successively switched to scan a color image, but imaging devices sensitive to different colors may be provided on a single sensor chip, by providing each imaging device with a color filter, for example, so that a color image can be scanned with a monochrome light source.

Figure 35:
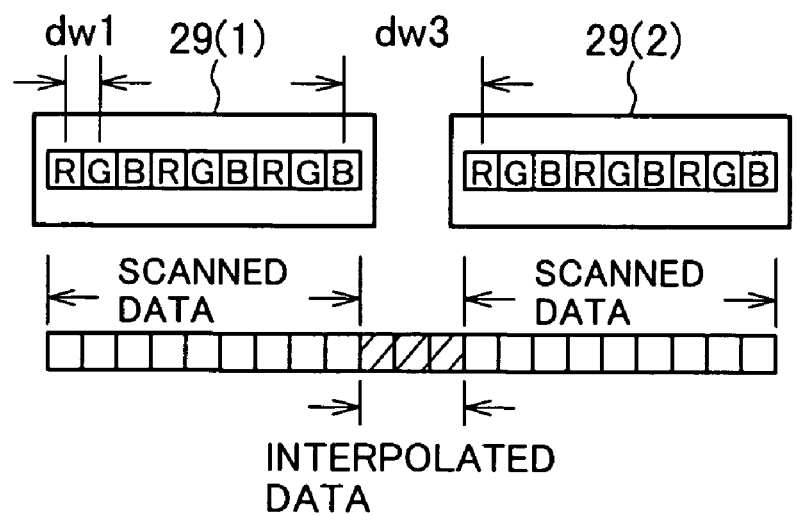
FIG. 35 shows the relationship between the imaging devices and missing pixels in the imager unit of an image scanner according to a fifth embodiment.

FIG. 35 shows details of the contact image sensor in a fifth embodiment. In the contact image sensor shown in FIG. 35, each sensor chip 29 is sensitive to a number (Nc) of different colors, such as the three colors red (R), green (G), and blue (B), and accordingly includes several types of imaging devices (R, G, and B) that scan different image colors. The different types (Nc types) of imaging devices sensitive to different colors are arranged in a certain order, such as red, green, blue.

The leftmost imaging devices of the sensor chips 29 are all sensitive to the same color (red), the rightmost imaging devices are all sensitive to the same color (blue), and the number of imaging devices on each sensor chip 29 is the number of colors (Nc=3, for example) multiplied by an integer q (Nc×q, where q=3 in FIG. 35). The red-green-blue order is maintained by assuming that there are missing red, green, and blue pixels between adjacent sensor chips and obtaining interpolation data for the assumed missing pixels.

If the imaging devices on the same sensor chip 29 are spaced at intervals of dw1 as in the first embodiment, the blue-scanning rightmost imaging device of one sensor chip 29(1) and the red-scanning leftmost imaging device of the next adjacent sensor chip 29(2) are spaced at an interval dw3 greater than dw1. If Nc×q imaging devices of Nc types are disposed on the sensor chip 29, the structure of the interpolator unit can be simplified by placing the sensor chips so that dw3=dw1×Nc+1.

The interpolator unit is configured to perform pixel interpolation on a color-by-color basis by using data obtained from imaging devices sensitive to the same color. When a red missing pixel is interpolated, only red pixels in its neighborhood are used; when a green missing pixel is interpolated, only green pixels in its neighborhood are used; and when a blue missing pixel is interpolated, only blue pixels in its neighborhood are used.

Figure 36:
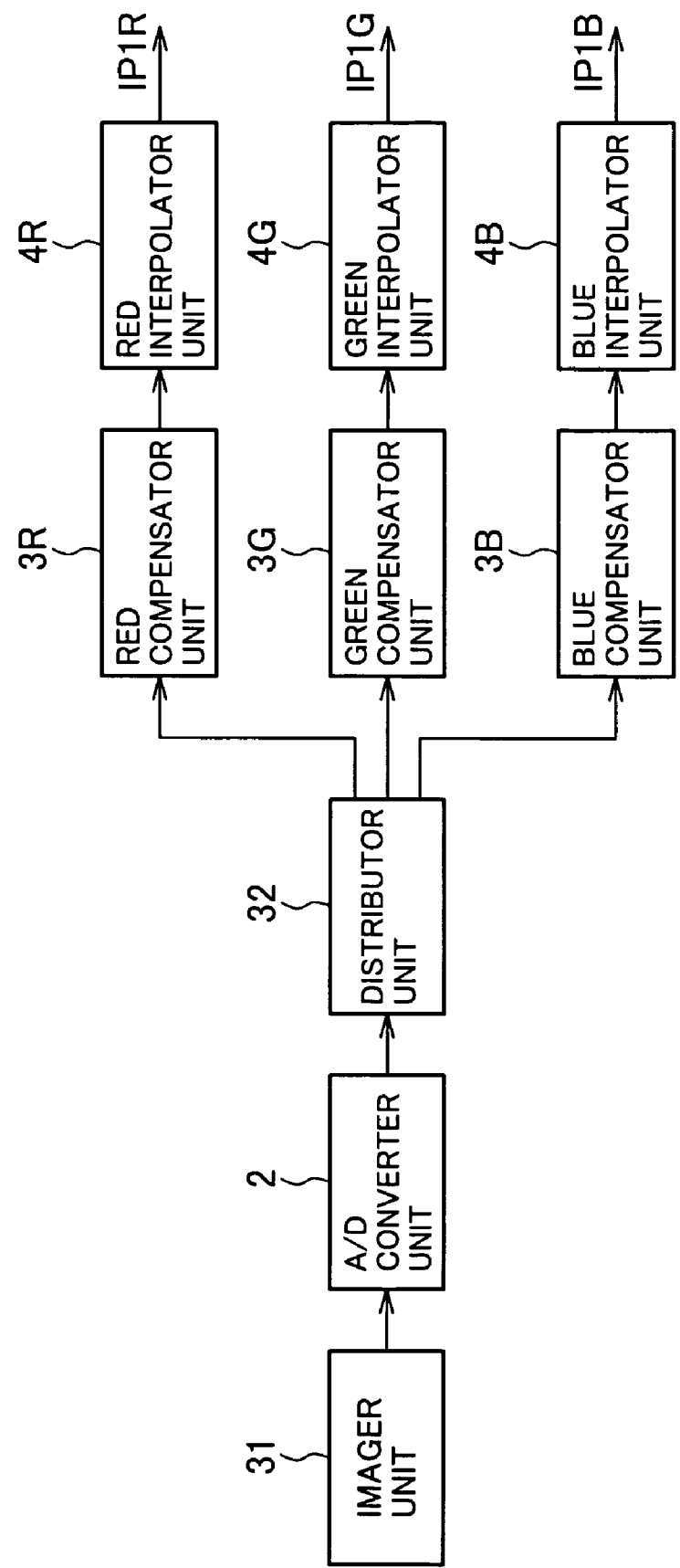
FIG. 36 is a block diagram showing the structure of the image scanner according to the fifth embodiment.

FIG. 36 is a block diagram showing the structure of the image scanner according to the fifth embodiment, including an imager unit 31 having a sequence of sensor chips 29 as shown in FIG. 35. The image scanner has an A/D converter unit 2, a distributor unit 32, a red compensator unit 3R, a green compensator unit 3G, a blue compensator unit 3B, a 4R, a green interpolator unit 4G, and a blue interpolator unit 4B, as well as the imager unit 31.

The imager unit 31 is the same as the imager unit 1 in the first embodiment except for the differences described with reference to FIG. 35.

The A/D converter unit 2 converts image signals output from the imager unit 31 into a series of digital pixel data.

The distributor unit 32 divides the pixel data output from the A/D converter unit 2, and supplies pixel data corresponding to signals from red imaging devices to the red compensator unit 3R, pixel data corresponding to signals from green imaging devices to the green compensator unit 3G, and pixel data corresponding to signals from blue imaging devices to the blue compensator unit 3B.

The red compensator unit 3R, green compensator unit 3G, and blue compensator unit 3B compensate for variations in characteristics in the same way as the compensator unit 3 in the first embodiment, but operate on supplied pixel data corresponding to signals from the red, green, and blue imaging devices respectively.

The red interpolator unit 4R, green interpolator unit 4G, and blue interpolator unit 4B interpolate missing pixels by using pixel data corrected by the red compensator unit 3R, green compensator unit 3G, and blue compensator unit 3B, respectively. The red interpolator unit 4R interpolates red missing pixels in accordance with pixel data corresponding to signals from the red imaging devices. The green interpolator unit 4G interpolates green missing pixels in accordance with pixel data corresponding to signals from the green imaging devices. The blue interpolator unit 4B interpolates blue missing pixels in accordance with pixel data corresponding to signals from the blue imaging devices.

With the configuration described above, the scanning process can be speeded up and the number of light source colors necessary for the contact image sensor is reduced.

Sixth Embodiment

Figure 37:
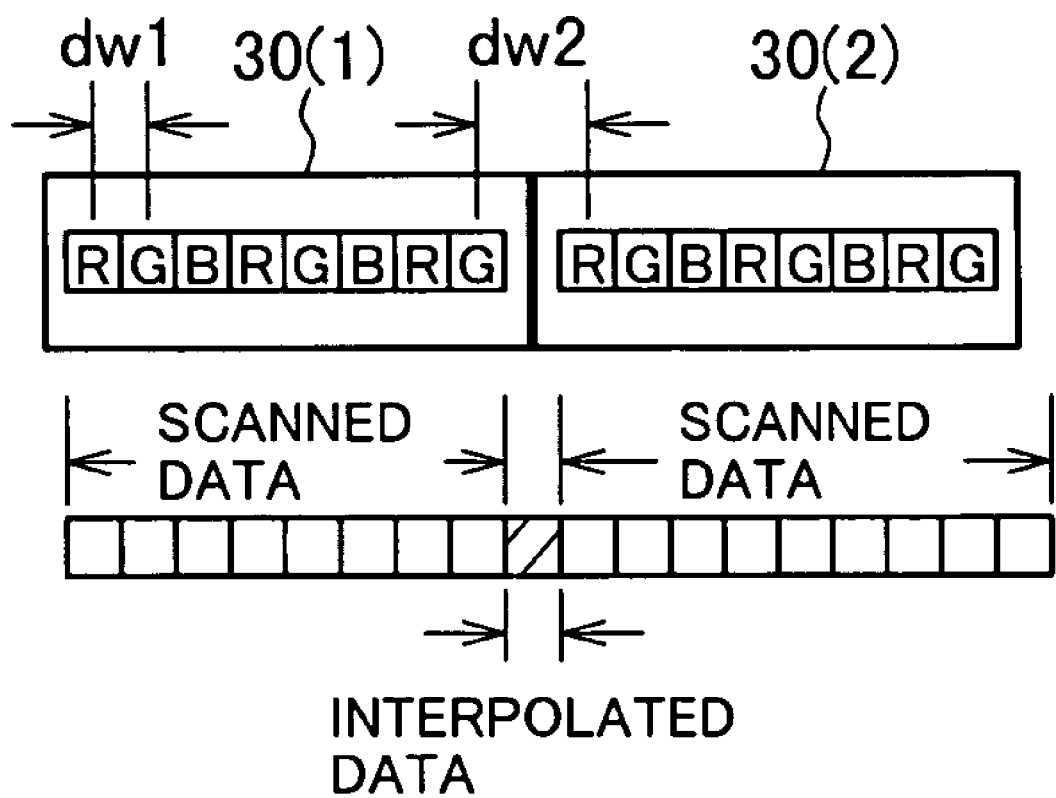
FIG. 37 shows the relationship between imaging devices and missing pixels in the imager unit of an image scanner according to a sixth embodiment.

FIG. 37 shows details of the contact image sensor in a sixth embodiment. In the contact image sensor shown in FIG. 37, each sensor chip 30 is sensitive to a plurality of different colors (e.g., Nc colors), such as the three colors red (R), green (G), and blue (B). Each sensor chip accordingly includes several types of imaging devices (R, G, and B) that scan different image colors, and the different types (Nc types) of imaging devices sensitive to different colors are arranged in a certain order, such as red, green, blue.

The leftmost imaging devices of the sensor chips 30 are all sensitive to the same color (red), the rightmost imaging devices are all sensitive to the same color (green), and the number of imaging devices on each sensor chip 30 is one less than the number of colors (Nc=3, for example) multiplied by an integer q (Nc×q−1, where q=3 in FIG. 37). The red-green-blue order is maintained by assuming that there are blue missing pixels between adjacent sensor chips and obtaining interpolation data for the assumed missing pixels.

If the imaging devices on the same sensor chip 30 are spaced at intervals of dw1 as in the first embodiment, the green-scanning rightmost imaging device of one sensor chip 29(1) and the red-scanning leftmost imaging device of the next adjacent sensor chip 30(2) are spaced at an interval dw3 greater than dw1. If Nc×q−1 imaging devices of Nc types are disposed on the sensor chip 30, the structure of the interpolator unit can be simplified by placing the sensor chips so that dw3=dw1×2.

The interpolator unit 4 of the sixth embodiment only has to interpolate blue pixels, so its structure can be simplified. A blue missing pixel is interpolated by using only neighboring non-missing blue pixels, as in the fifth embodiment.

Figure 38:
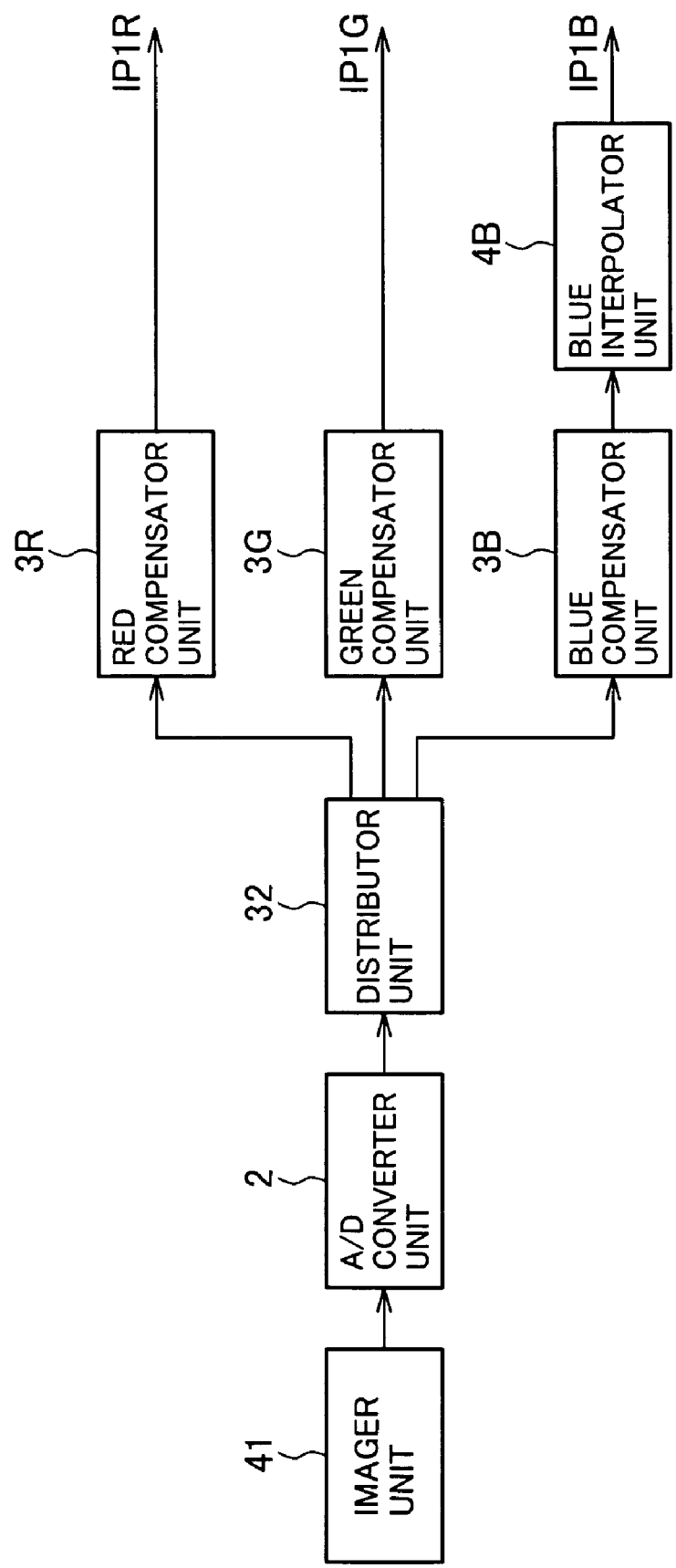
FIG. 38 is a block diagram showing the structure of the image scanner according to the sixth embodiment.

FIG. 38 is a block diagram showing the structure of the image scanner according to the sixth embodiment, including an imager unit 41 having a sequence of sensor chips 30 as shown in FIG. 37. The image scanner has an A/D converter unit 2, a distributor unit 32, a red compensator unit 3R, a green compensator unit 3G, a blue compensator unit 3B, and a blue interpolator unit 4B, as well as the imager unit 41.

The imager unit 41 is the same as the imager unit 1 of the first embodiment, except for the differences described with reference to FIG. 37.

The A/D converter unit 2 converts image signals output from the imager unit 41 into a series of digital pixel data.

The distributor unit 32 divides the pixel data output from the A/D converter unit 2, and supplies pixel data corresponding to signals from red imaging devices to the red compensator unit 3R, pixel data corresponding to signals from green imaging devices to the green compensator unit 3G, and pixel data corresponding to signals from blue imaging devices to the blue compensator unit 3B.

The red compensator unit 3R, green compensator unit 3G, and blue compensator unit 3B compensate for variations in characteristics in the same way as the compensator unit 3 in the first embodiment, operating on supplied pixel data corresponding to signals from the red, green, and blue imaging devices, respectively.

The blue interpolator unit 4B interpolates missing pixels by using pixel data corrected by the blue compensator unit 3B.

A blue missing pixel is interpolated in accordance with pixel data corresponding to signals from the blue imaging devices.

In other respects, the structure and the operation are the same as in the fifth embodiment.

With this configuration, the spaces between the sensor chips can be reduced, and the quality of the interpolated image can be improved.

The number of missing pixels that must be interpolated is also less than in the fifth embodiment.

What is claimed is:

1. A pixel interpolation circuit for interpolating a missing pixel in an image, comprising:

a plurality of mean preserving interpolation calculation circuits for determining values of candidate interpolation data DI for the missing pixel such that a mean value of a plurality of pixels constituting an inclusive group of pixels including the missing pixel is equal to a mean value of a plurality of pixels constituting a non-inclusive group of pixels not including the missing pixel but being disposed near the missing pixel and having the same number of pixels as the inclusive group of pixels, each mean preserving interpolation calculation circuit also selecting one of the plurality of pixels disposed near the missing pixel as a test pixel T, and determining a value of test interpolation data TD for the test pixel such that a mean value of a plurality of pixels equal in number to the inclusive group and including the test pixel is equal to a mean value of a plurality of pixels equal in number to the non-inclusive group of pixels and not including the test pixel but being disposed near the test pixel;

a left-right mean interpolation calculation circuit for determining a mean value of pixels disposed on the left and right of the missing pixel as interpolation candidate data D0 and determining a mean value of pixels on the left and right of each said test pixel as test interpolation data TD0; wherein mutually differing numbers of pixels k1-kn in said inclusive group of pixels and said non-inclusive group of pixels are set in the mean preserving interpolation calculation circuits, which determine a plurality of interpolation candidate data DI1-Din and test interpolation data TD1-TDn; further comprising a marking circuit for calculating a difference between actual image data of the test pixels and each of the plurality of test interpolation data TD0-TDn calculated by the left-right interpolation calculation circuit and the mean preserving interpolation calculation circuits as marking data M0-Mn; and an output circuit for outputting the interpolation candidate data calculated by the circuit having minimum marking data, among the left-right mean interpolation calculation circuit and the mean preserving interpolation calculation circuits, as interpolation data IP for the missing pixel.

2. The pixel interpolation circuit of claim 1, further comprising an output limiting circuit for limiting values of the interpolation candidate data of each of the mean preserving interpolation calculation circuits according to a maximum value Lmax and a minimum value Lmin of the plurality of pixels disposed near the missing pixel.

3. An image scanner comprising:
an imager unit having a connected plurality of imaging elements and outputting an image signal of an image scanned by the imaging elements;
an A/D converter unit for converting the image signal output from the imager unit to digital pixel data; and
the pixel interpolation circuit of claim 1; wherein the pixel interpolation circuit calculates interpolation pixel data for interpolating missing pixels not present in the digital image data.

4. The image scanner of claim 3, further comprising a compensator unit for receiving the digital image data output from the A/D converter, correcting the digital image data to compensate for variations in characteristics of the imaging elements, and outputting the digital image data to the pixel interpolation circuit.

5. The image scanner of claim 3, further comprising:
means for dividing the image signal output from the imaging unit into a plurality of parts per line and outputting the parts in parallel;
a plurality of sample-hold circuits for sampling and holding the image signals output in parallel; and
a selection means for selecting the sample-hold circuits sequentially; wherein
the image signal output by the selection means is input to the A/D converter.

6. The image scanner of claim 3, wherein:
the imaging elements include a plurality of devices sensitive to a plurality of colors, for outputting pixel signals corresponding to each color;

the A/D converter converts the image signal corresponding to each color to digital image data; and
the pixel interpolation circuit calculates interpolation pixel data interpolating the missing pixel on the basis only of image data of pixels of the same color in the digital image data.

7. A pixel interpolation method for interpolating a missing pixel in an image by a pixel interpolation circuit comprising:
a plurality of mean preserving interpolation calculation steps for determining values of candidate interpolation data DI for the missing pixel such that a mean value of a plurality of pixels constituting an inclusive group of pixels including the missing pixel is equal to a mean value of a plurality of pixels constituting a non-inclusive group of pixels not including the missing pixel but being disposed near the missing pixel and having the same number of pixels as the inclusive group of pixels, each mean preserving interpolation calculation step also selecting one of the plurality of pixels disposed near the missing pixel as a test pixel T, and determining a value of test interpolation data TD for the test pixel such that a mean value of a plurality of pixels equal in number to the inclusive group and including the test pixel is equal to a mean value of a plurality of pixels equal in number to the non-inclusive group of pixels and not including the test pixel but being disposed near the test pixel;

a left-right mean interpolation calculation step for determining a mean value of pixels disposed on the left and right of the missing pixel as interpolation candidate data DO and determining a mean value of pixels on the left and right of each said test pixel as test interpolation data TD0; wherein mutually differing numbers of pixels k1-kn in said inclusive group of pixels and said non-inclusive group of pixels are set in the mean preserving interpolation calculation steps, which determine a plurality of interpolation candidate data DI1-Din and test interpolation data TD1-TDn; further comprising a marking step for calculating a difference between actual image data of the test pixels and each of the plurality of test interpolation data TDO-TDn calculated by the left right interpolation calculation step and the mean preserving interpolation calculation steps as marking data MO-Mn; and an output step for outputting the interpolation candidate data calculated by the interpolation calculation step having minimum marking data, among the left-right mean interpolation calculation step and the mean preserving interpolation calculation steps, as interpolation data IP for the missing pixel.

8. The pixel interpolation method of claim 7, further comprising an output limiting step for limiting values of the interpolation candidate data in each of the mean preserving interpolation calculation steps according to a maximum value Lmax and a minimum value Lmin of the plurality of pixels disposed near the missing pixel.

* * * * *